(12) United States Patent
Sun et al.

(10) Patent No.: US 7,227,568 B2
(45) Date of Patent: Jun. 5, 2007

(54) DUAL POLARIZING LIGHT FILTER FOR 2-D AND 3-D DISPLAY

(76) Inventors: Li Sun, 511 Windmere Way, New Hope, PA (US) 18938; Wanming Lao, 511 Windmere Way, New Hope, PA (US) 18938

( * ) Notice: Subject to any disclaimer, the term of this patent is extended or adjusted under 35 U.S.C. 154(b) by 0 days.

(21) Appl. No.: 11/092,889

(22) Filed: Mar. 29, 2005

(65) Prior Publication Data
US 2005/0219357 A1    Oct. 6, 2005

Related U.S. Application Data

(60) Provisional application No. 60/558,898, filed on Apr. 3, 2004.

(51) Int. Cl.
*H04N 7/18* (2006.01)
(52) U.S. Cl. .......................... 348/58; 348/57
(58) Field of Classification Search ............. 348/42–60
See application file for complete search history.

(56) References Cited

U.S. PATENT DOCUMENTS 5,469,295 A * 11/1995 Burke ........................ 359/478
6,141,465 A * 10/2000 Bischel et al. ................. 385/4

* cited by examiner

*Primary Examiner*—Andy S. Rao
(74) *Attorney, Agent, or Firm*—Robert Platt Bell

(57) ABSTRACT

A stereoscopic display and record component, more specifically a dual polarizing light filter, and the methods of applying the component for stereoscopic image displaying and stereoscopic image recording, are disclosed. A dual polarizing light filter may be statically or dynamically controlled to deliver or accept polarizing light of different orientations at different micro regions on the filter at different times. The invention may be used to create a new type display device and a new type of recording method for both 2-D and 3-D images. The component may be added to existing displays as well as integrated into the display fabrication process.

23 Claims, 23 Drawing Sheets

DUAL POLARIZING LIGHT FILTER FOR 2-D AND 3-D DISPLAY

CROSS-REFERENCE TO RELATED APPLICATIONS

The present application claims priority from Provisional U.S. Patent Application No. 60/558,898 filed on Apr. 3, 2004, and incorporated herein by reference.

FIELD OF THE INVENTION

The presented invention relates to a three-dimensional (3-D) image display method and apparatus and 3-D image record method and apparatus, both using polarized light, and more particularly, relates to a combined two-dimensional (2-D) and three-dimensional display and recording method and apparatus.

BACKGROUND OF THE INVENTION

Humans perceive the real world through two views obtained by both eyes, using so-called stereoscopic vision. The human brain interprets the two views, generates space distance from the views and thus forms a 3-D vision. A 3-D displaying method is the method for simulating the stereoscopic observing process.

There are basically two types of three-dimensional (3-D) display methods: auto-stereoscopic display and stereoscopic display. Auto-stereoscopic display is a type of method in which the observers do not need wear special glasses to view a 3-D image. This type of method usually has limitations such as a narrow functional view angle and small functional view region.

Stereoscopic display is a type of method where the observers need wear special glasses to obtain a 3-D view. Early techniques utilized colored filters and color-tinted images to separate left and right images to produce a 3-D effect. More modern approaches use polarized light to deliver the stereoscopic images and using correspondingly polarizing glasses to separate the stereoscopic images to different eyes, by which the image is viewed. This type of method usually requests the two images to be overlapped so that the brain may interpret them as they are from the same scene.

A number of 3-D imaging systems using polarization are known in the art. Faris, U.S. Pat. No. 6,359,664, issued Mar. 19, 2002, and incorporated herein by reference, discloses an electro-optical display system for 3-D stereoscopic imaging. Faris imparts polarization to light emanating from optically transparent patterns using a micro-polarizer, to form polarized spatially multiplexed image. Faris, U.S. Pat. No. 6,563,553, issued May 13, 2003, also incorporated herein by reference, discloses an electro-optical image display system for a laptop computer. This device includes an array of electrically active and passive cholesteric liquid crystal elements, which are arranged in logic tree form to steer the electromagnetic beam. However, it appears that Faris uses a electrically "passive" circular polarization filter to achieve his micro-polarization regions.

Vrex (Reveo) appears to now own the Faris Patents. A complete timeline of their 3-D imaging development may be found at: http://www.vrex.com/about/timeline.shtml. The only product for creating a 3-D display from an LCD screen appears to be a clip-on "micropol" screen (See, http://www.vrex.com/products/_download/vrex_mp_kit.pdf, incorporated herein by reference) attached externally to a laptop computer or the like. It would be more effective from a packaging and cost perspective to offer a 3-D technology integrated into the LCD panel itself.

Kwon, Published U.S. Patent Application 2002/0145682, published Mar. 19, 2002, discloses a stereoscopic liquid crystal display device, which has a liquid crystal polymer film with first and second micro-polarizing regions, and a first polarizing plate. Kwon also discloses the use of a common electrode for his device. Kwon discloses a LCD stereoscopic display using "micro-polarizing" regions, which appear to polarize different portions of the display. Unlike Faris, it appears that Kwon uses a Liquid Crystal device for polarization (See paragraph [0030]). In addition, Kwon describes the use of two polarization plates and a common electrode plate Referring to FIG. 4 of Kwon, Kwon uses a typical LCD structure, if you remove layer 104. However, like Faris, uses a passive polarizing film to create the left and right images for display. Layer 104 is a liquid crystal polymer film, which is a newer material. The status of the liquid crystal molecules in the polymer base may be altered and locked using UV light or other method to create a polarizable film. Kwon uses this material to make his dual polarization layer which despite its name is a passive polarization layer as in Faris.

Tomono, Published U.S. Patent Application 2003/0067563, published Apr. 10, 2003, discloses a 2-D and 3-D changeable display, which has liquid crystal layer with plate having a matrix of fine holes. This matrix appears to be removable to convert between 2-D and 3-D display. Tomono is similar to Reveo in that it provides a removable screen to convert to 3-D display.

Yamazaki, U.S. Pat. No. 6,348,957, issued Feb. 19, 2002, discloses a direct viewing type LCD device—in which layout processing is performed to two groups of LC layer, where corresponding first and second images are formed.

While the Prior Art devices may have some success in generating 3-D displays, it remains a requirement in the art to provide a display which may generate both 2-D and 3-D images without having to install or remove screens or polarizing films or the like. Moreover, it remains a requirement in the art to provide a display, which may generate both 2-D and 3-D images as opposed to a dedicated 3-D display. In addition, it remains a requirement in the art to provide a 2-D/3-D display, which may be integrated into an LCD flat panel display to realize a compact size and inexpensive construction.

SUMMARY OF THE INVENTION

In the presented invention, two images are captured for a 3-D scene to simulate human observation using two eyes. The two images are referenced as the left image and the right image, respectively. The pixels from both images are mixed in certain way and rendered on the display screen such that the left and the right images are either overlapped together on the screen at different display cells at the same time (spatial multiplexing) or are overlapped on the screen at same display cell at different times (time multiplexing).

Each micro-region, referenced as a unit hereafter, on the dual polarizing light filter, referenced as DP filter hereafter, is aligned to a pixel cell on the display screen in a one-to-one relationship. Light illuminated from each screen pixel cell travels through the aligned unit on the DP filter and becomes polarized light. Since the polarizing direction may be controlled in each unit of the DP filter at any time, the screen pixel cells that display the left image pixels always illuminate polarizing light in one direction and have the screen pixel cells that display the right image pixels illuminate polarizing light in another direction after the light pass through the DP filter.

The two directions of the polarized light illuminated through the DP filter are generally perpendicular. An observer may see a 3-D scene through polarizing glasses from this mixed pixel light if the polarizing directions of the light from the left image and from the right image are parallel with the polarizing axis of the left lens and the right lens of the polarizing glasses, respectively.

Within the spirit and scope of the present invention, there are a number of ways to mix the left and the right images and render them to the display screen. One example is to interlace the left image and the right image line by line and to render to the odd pixel cell rows and the even pixel cell rows respectively. In one embodiment, the odd pixel rows of the left image are rendered to the odd pixel cell rows of the screen and the even pixel rows of the right image are rendered to the even pixel cell rows of the screen. A different control voltage is correspondingly applied to either the odd unit rows or the even unit rows of the DP filter so the left image pixels and the right image pixels may be distinguished by their perpendicular polarizing direction.

When applying the presented invention to recording devices, two sets of lens groups, spaced apart a proper distance to simulate the distance between human eyes, are used to collect the left image light and the right image light. Light traveling through the different lenses, e.g., left lens and right lens, are polarized with the polarizing direction of the respective right and left images perpendicular to one another. Light through the left lens and the right lens are then merged together and redirected towards the image-recording device, which may comprise any one of a number of electronic or analog image recording devices known in the art.

The DP filter is located in front of a recording medium, such as film or an electrical light sensor. The DP filter unit is controlled in a way that it either blocks the left lens light or blocks the right lens light at different units, and half of the units block the left lens light and another half of the units block the right lens light. Thus the left image and the right image are recorded at different pixel cells on the film or on the light sensors (e.g., CCD or the like).

There are many different arrangements to control the DP filter units within the spirit and scope of the present invention. In one embodiment, the odd unit rows are configured on the DP filter to pass the left lens light and block the right lens light, and the even unit rows are configured on the DP filter to pass the right lens light and block the left lens light. When the mixed light from left and right lens both travel through the DP filter and reaches the film or the light sensors, the odd pixel rows of the film or the light sensors records the odd rows of the left image pixels and the even pixel rows of the film or the light sensor records the even rows of the right image pixels.

In the present invention, the DP filter use the specific property of a liquid crystal (LC) to perform the polarizing and other filtering and separation functions. The LC molecules in their natural status are arranged in a loosely ordered fashion with their long axis parallel to one another. When they come into contact with a finely grooved surface, the molecules line up parallel along grooves. When LC is sandwiched between two plates with the opposite surfaces finely grooved and the groove directions of two plates in perpendicular, the long axis direction of the LC molecules are gradually twisted 90 degrees between the two plates.

With the polarizing direction parallel to the groove direction of the first plate, when the polarizing light passes through LC, it follows the direction of the long axis of the LC molecules. Thus, the polarizing direction of the incident light twists 90 degrees after the light travels through the LC.

When an electric field is applied on the LC, the molecules rearrange themselves with the long axis direction along with the electric field direction. Thus when applying voltage between the first and the second plate, the LC molecules rearrange themselves and stop twisting the incident light. The light passes through the LC maintains its original oscillation direction.

In the present invention, an optional linear polarizing film is combined with an LC sandwich structure, in which the LC molecules long axis directions are gradually twisted 90 degrees. With two transparent electrode layers controlling the voltage applied to each unit, an electrically controllable DP filter is created. Each transparent electrode on the transparent electrode layer defines an individually controllable micro region, referenced as a unit, of the DP filter.

The polarizing direction on each desired unit of the DP filter may be changed and controlled dynamically, providing the display industry, the media industry, and the computer hardware and software industry great flexibility on various areas of 3-D imaging, such as image recording, image data storing, data signal converting, signal broadcasting, signal mixing and rendering.

The invention may be applied on any display device which illuminates light itself, either regular natural light or polarizing light, by slightly varying DP filter structure. The invention may also be applied on any image-recording device. When the unit controlling arrangement and the image display rendering arrangement of the DP filter are the same, the image data process effort may be minimized or even the image may be displayed as is without any processing.

The invention takes advantage of modern LCD manufacturing equipment and technologies, thus the cost of the new technology evaluation is minimized. The present invention also includes the manufacture method of the DP filter. There is no conflict between 2-D image signals and 3-D image signals in using the invention. A display device with DP filter displays 2-D images naturally if 2-D image signal is rendered. An image-recording device with DP filter may record a 2-D image as well without notice. The polarizing light has no affect to the naked eyes or the light sensors in a camera for 2-D image application.

DETAILED DESCRIPTION OF THE INVENTION

Figure 1:
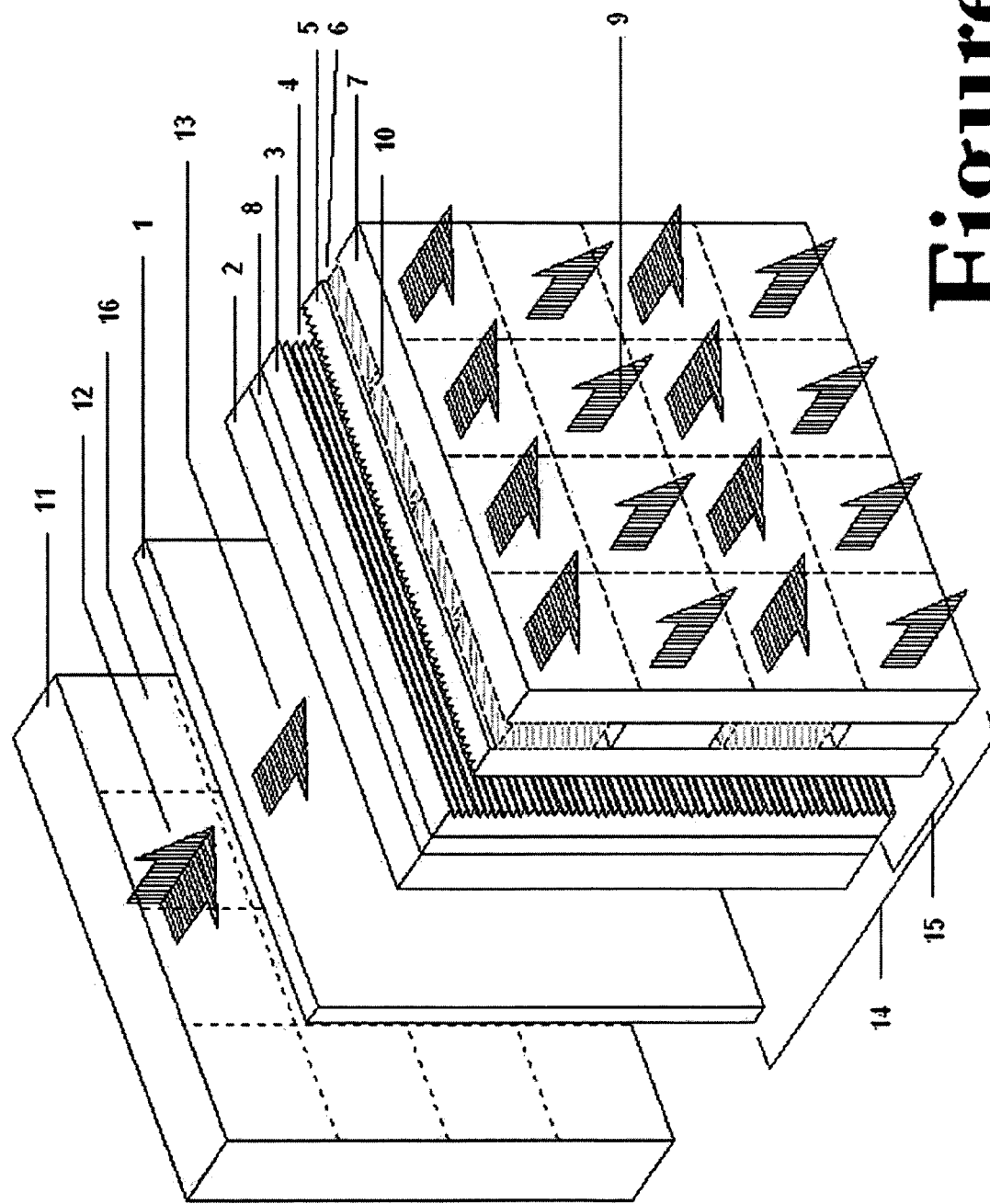
FIG. 1 is a perspective view of one embodiment of the DP Filter of the present invention.

FIG. 1 is a perspective view of one embodiment of the DP Filter 14 of the present invention. First glass substrate 2 and second glass substrate 7 are facing and spaced apart from each other. A common electrode layer 8 is formed on the inner surface of first glass substrate 2. A unit polarizing control layer 6 is formed on the inner surface of second glass substrate 7. A liquid crystal sandwich structure layer 15 is formed between the unit polarizing control layer 6 and the common electrode layer 8. An optional linear polarizing film 1 is formed on the outer surface of first glass substrate 2. A display screen of any type 11 is attached to the DP Filter 14. If display screen 11 illuminates polarizing light, the linear polarizing film 1 may be omitted.

LC layer 15 may have a first alignment layer 3 and a second alignment layer 5 with liquid crystal 4 filled in between of them. To maintain a uniform space between alignment layers, a spacer, (not shown) may be used between layer 3 and layer 5. The groove direction of alignment layer 3 and alignment layer 5 are perpendicular to one another.

Figure 3:
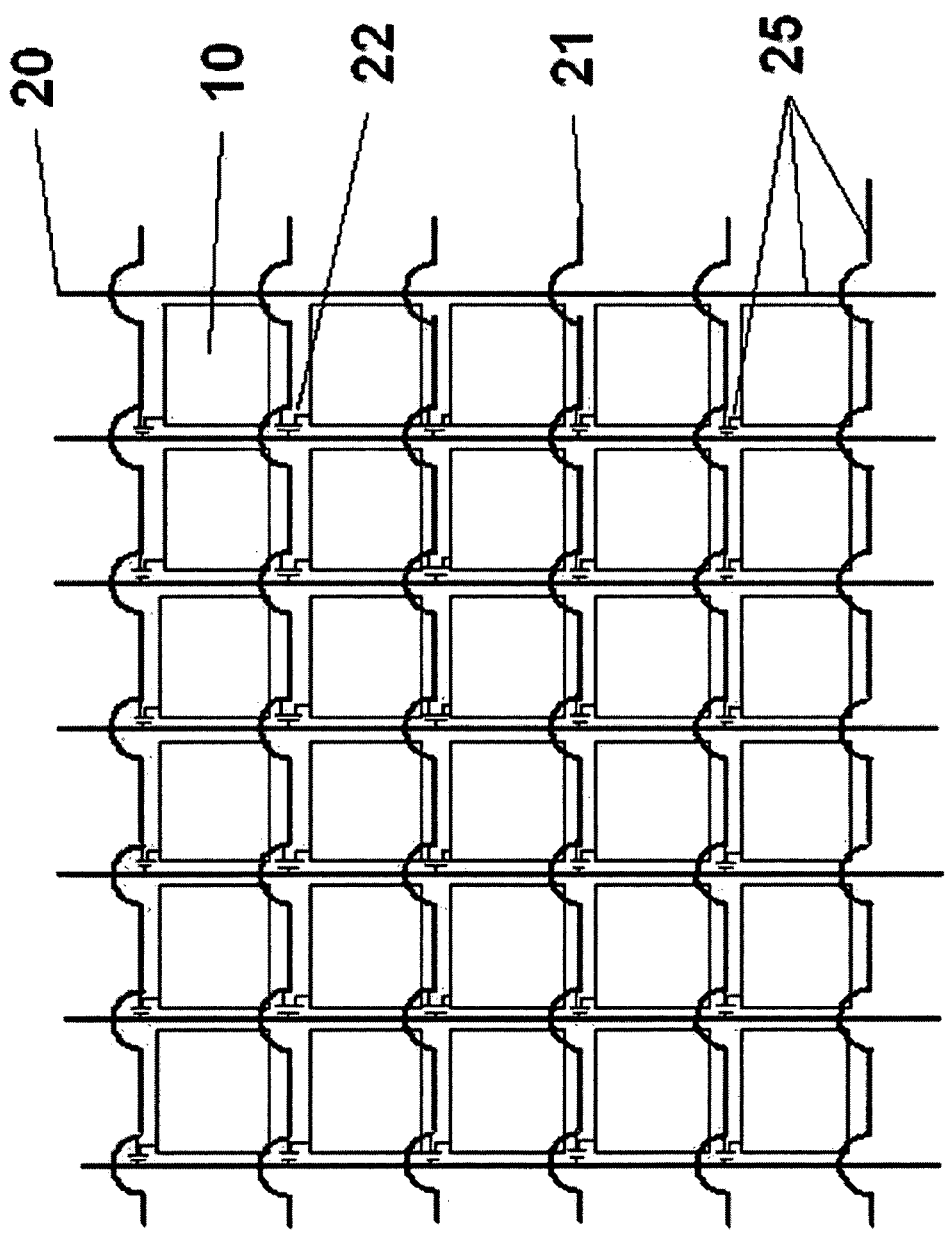
FIG. 3 illustrates the unit polarizing control layer of FIG. 1, as it comprises the transparent electrodes and the driving circuit.

FIG. 3 illustrates the unit polarizing control layer 6, as it comprises transparent electrodes 10 and driving circuit 25. Driving circuit 25 may have voltage signal conductors 21, switching signal conductors 20, and switching transistors 22 which connect transparent electrodes 10 to circuit conductors 21. The arrangement of transparent electrodes 10 and driving circuit 25 as illustrated in FIG. 3 is only one of many possible combinations of different electrode arrangements and different driving circuits. Depending upon the method for driving LC sandwich structure 15 and rendering the image on display screen 11, different driving circuits and electrode arrangements may be selected to form unit polarizing control layer 6. The space of each transparent electrode 10 corresponds to a unit of DP Filter 9 in FIG. 1. The size of the unit 9 is the same of the size of the pixel cell 16 of display screen 11. Each unit 9 is aligned to a pixel cell 16.

In FIG. 1, light 12 comes from image display screen 11, enters DP Filter 14, and becomes polarized light 13 after passing through linear polarizing film 1. As polarized light 13 passes through LC sandwich structure layer 15, the polarizing direction either maintains unchanged, where voltage is applied on the transparent electrodes 10, or is twisted 90 degrees where voltage is not applied on transparent electrodes 10. Thus, light passing through different units of DP Filter 14 may have two different polarizing directions perpendicularly.

In FIG. 1, transparent electrodes 10 may be formed for every unit of DP Filter 14. The voltage is applied and only applied on all transparent electrodes 10 in odd rows. Thus, the illuminated light from the units of the odd rows maintains the polarizing direction of the incident light and the illuminated light from the units of the even rows twists 90 degrees of the polarizing direction of the incident light.

Figure 5:
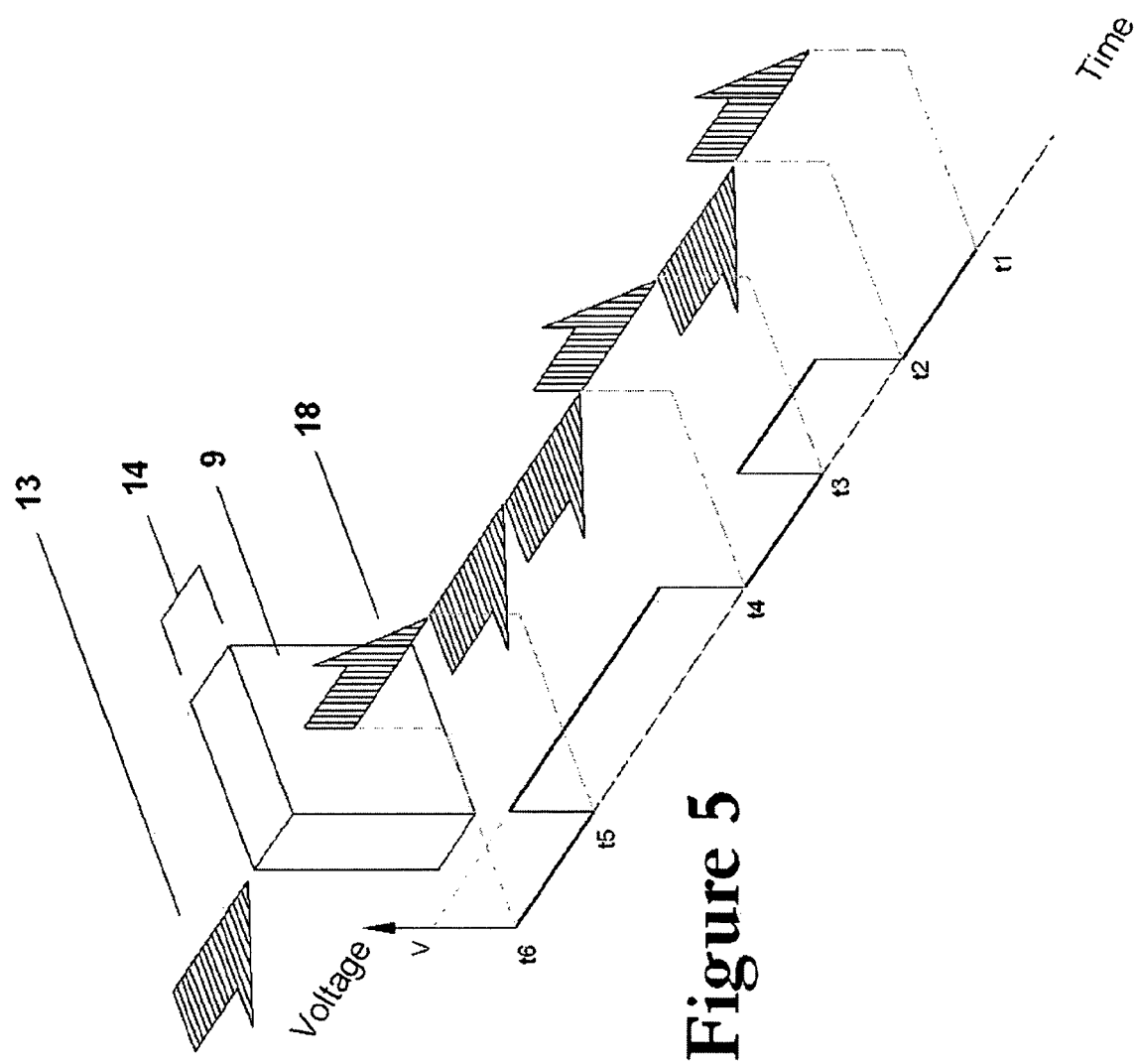
FIG. 5 illustrates one unit of the DP Filter of FIG. 1 embodiment and how the illuminated polarizing direction changes when the voltage applied on the transparent electrode changes over the time.

FIG. 5 illustrates one unit 9 of DP Filter 14 and the illuminated polarizing direction 18 changes when the voltage applied on the transparent electrode 10 of FIG. 3 changes over the time. In FIG. 5, incident light 13 has a horizontal polarizing direction. No voltage is applied to transparent electrode 10 at time t1 and maintains until time t2. The illuminated polarizing light has a vertical polarizing direction in the time period from t1 to t2. A voltage V is applied to transparent electrode 10 after time t2 and maintains its value until time t3. The illuminated light in the time period t2 to t3 has a horizontal polarizing direction. From time t3 to t4, the voltage is dropped back to 0, so polarizing direction of illuminated light is vertical again. The voltage signal applied on the electrode is raised back to value V again between time t4 and t5, and the illuminated polarizing direction switch back to horizontal again, and so on. This Figure illustrates that any unit of the DP Filter may illuminates polarizing light in different polarizing directions perpendicularly at different times dependent on the voltage signal applied on its electrode over time.

Figure 6:
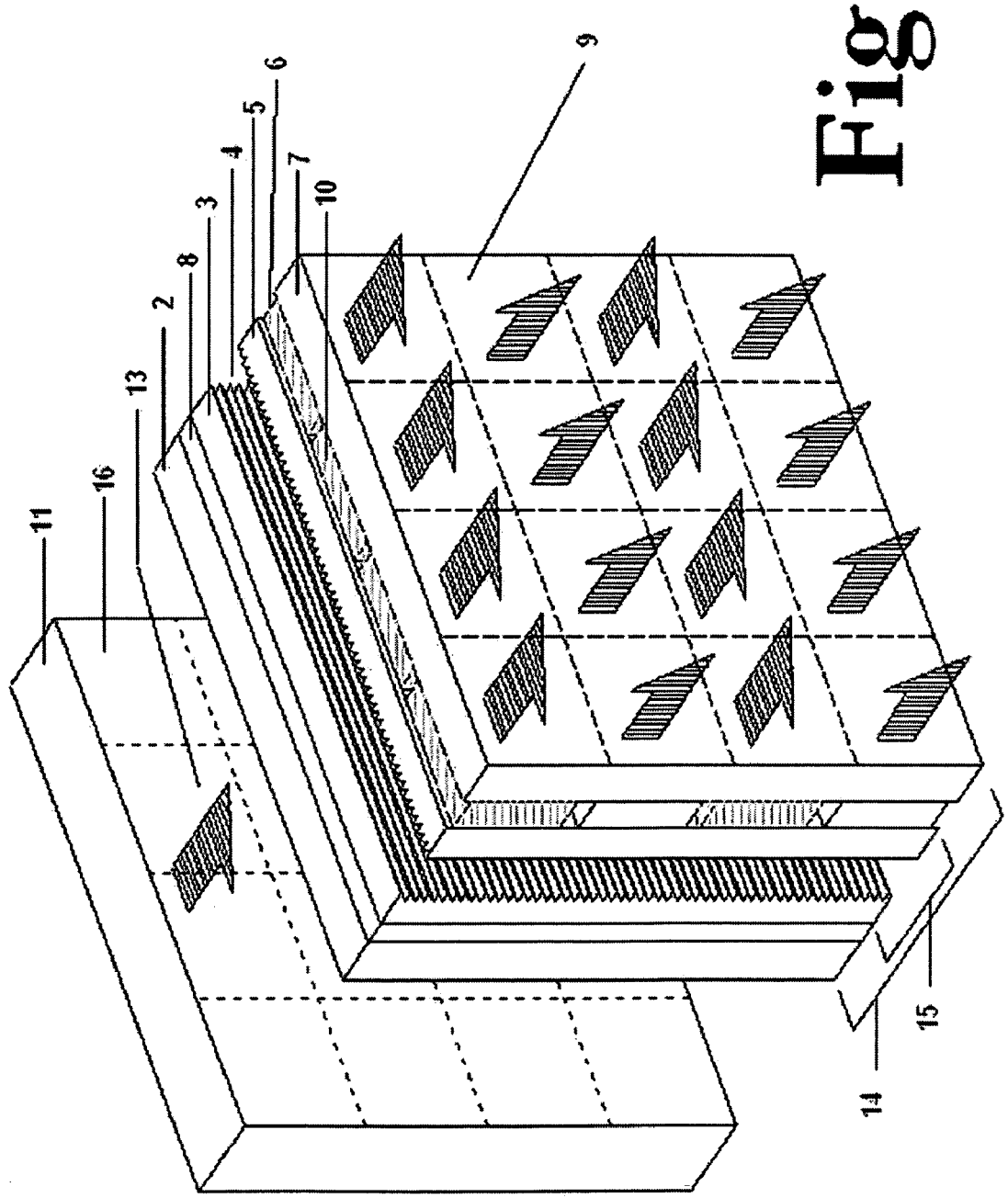
FIG. 6 is a perspective view of the DP Filter of FIG. 1 without the optional linear polarizing film.

FIG. 6 is a perspective view of DP Filter 14 without the optional linear polarizing film 1. In FIG. 6, display screen 11 illuminates polarizing light 13.

Figure 7:
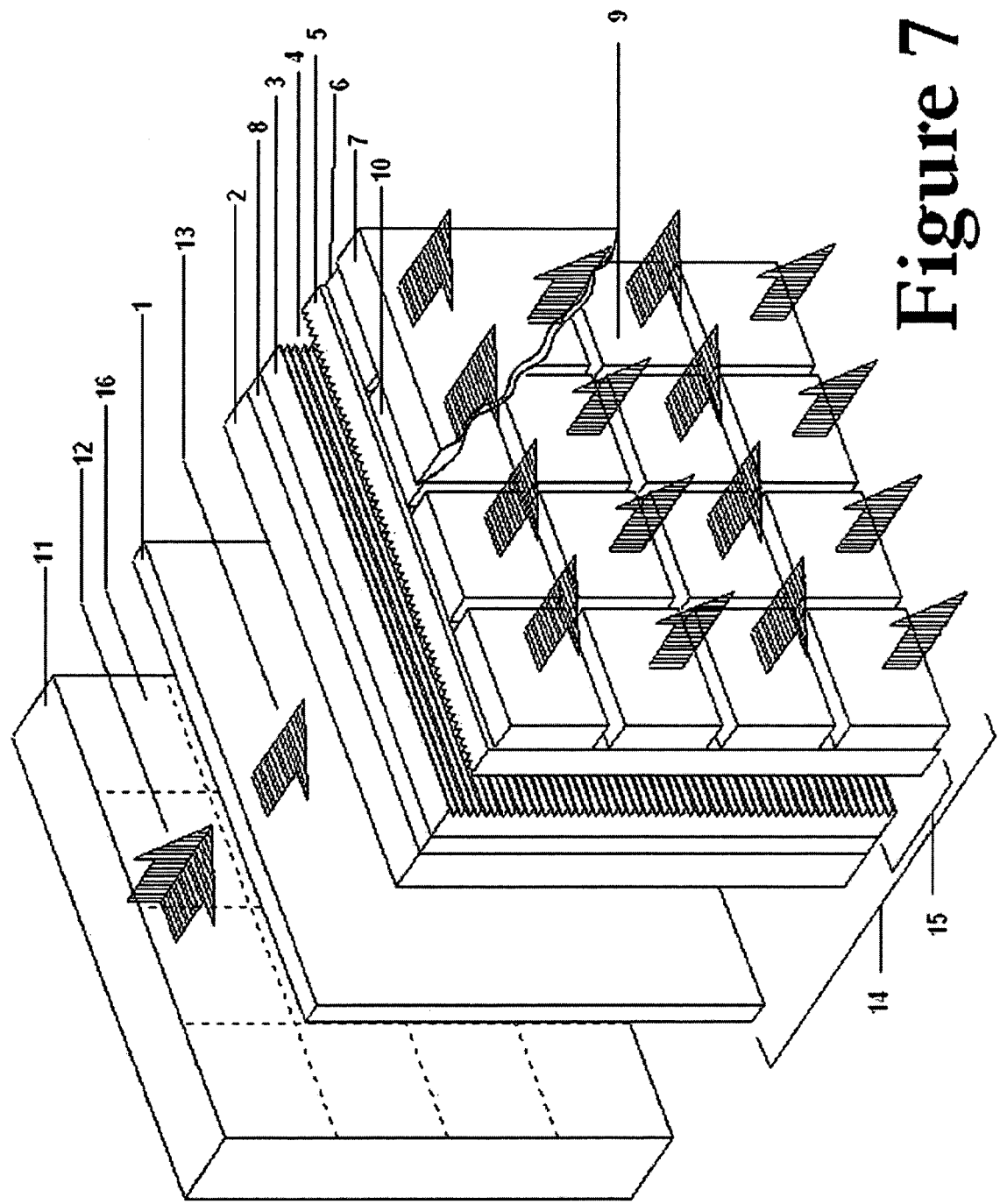
FIG. 7 is a perspective view of the DP Filter of FIG. 1, in which the second glass substrate is partially removed to clearly show the transparent electrodes arrangement on the unit polarizing control layer.

FIG. 7 is a perspective view of DP Filter 14, in which second glass substrate 7 is partially removed to clearly show the arrangement of transparent electrodes 10 on unit polarizing control layer 6. FIG. 7 illustrates one of many possible arrangements of transparent electrodes 10. Transparent electrodes 10 are positioned for each unit 9 of DP Filter 14. This arrangement provides the most flexible controls on the polarizing direction of each unit. The polarizing control voltage may be applied to the electrodes dynamically by using, but not limited to, active matrix drive circuits and thin film transistors (TFTs), not shown. The voltage signals may be flushed through the units of the DP Filter synchronized with the image signals flushed through the pixel cells of the display screen. The polarizing control voltage may be also applied to the electrodes statically by using different driving circuits for different fixed image rendering patterns.

Figure 8:
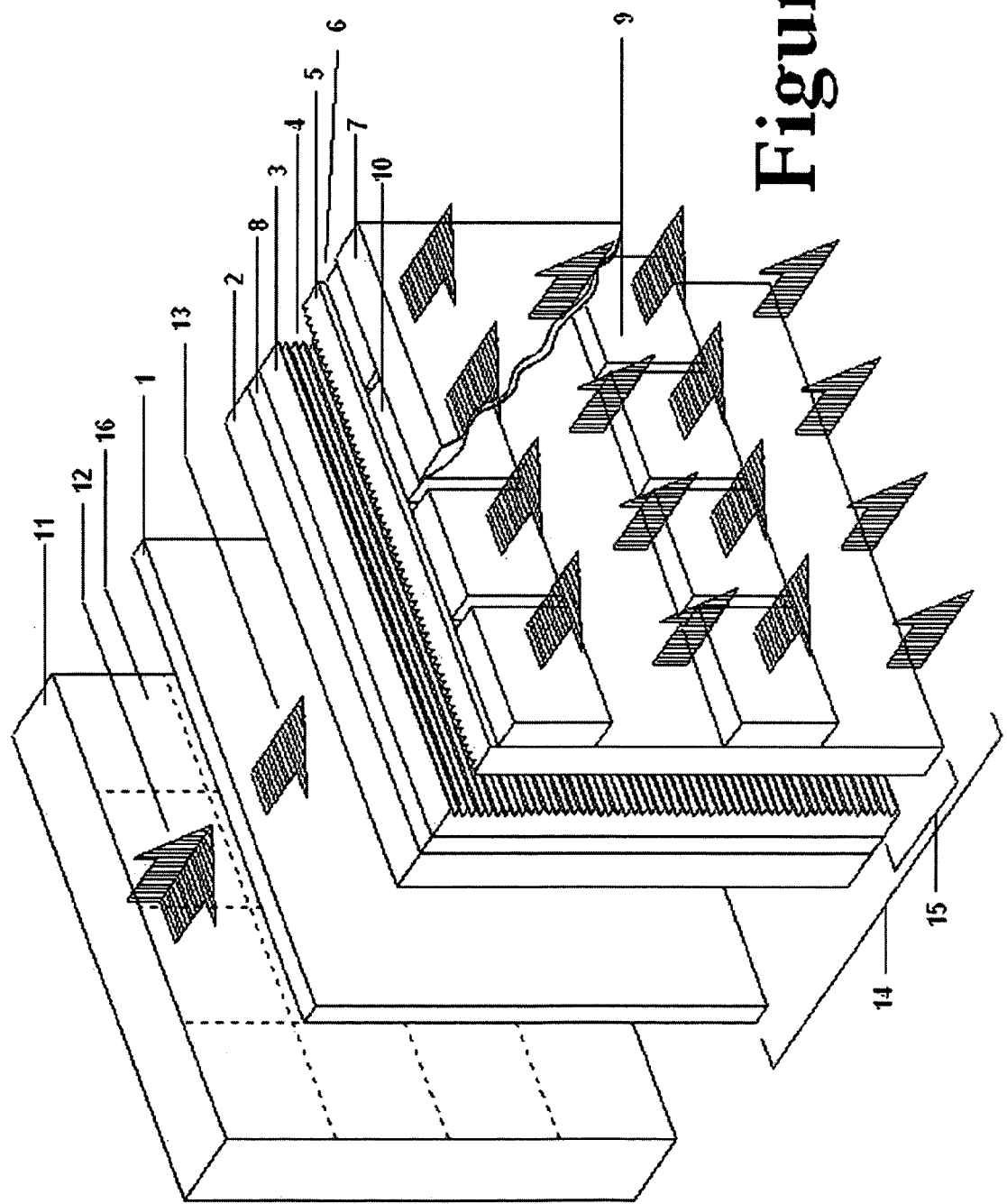
FIG. 8 is a perspective view of the DP Filter of FIG. 1, with different transparent electrode arrangement, in which the second glass substrate is partially removed to clearly show the unit polarizing control layer.

FIG. 8 is a perspective view of DP Filter 14, in which second glass substrate 7 is partially removed to clearly show unit polarizing control layer 6. Transparent electrodes 10 are formed only on every other row for one of many possible fixed image mixing and rendering patterns. The pixels of the left image are rendered on odd rows and the pixels of the right image are rendered on the even rows. It may be predetermined that the odd rows of DP Filter 14 may maintain the polarizing direction and the even rows may twist the polarizing direction 90 degrees. FIG. 8 illustrates the electrodes are only formed on odd rows, and thus the polarizing direction may be maintained when voltage is applied, while the polarizing light passes through the even rows may always be twisted 90 degrees. The control voltage may be applied statically by connecting all the electrodes to, but not limited to, a common voltage source. The voltage may be applied dynamically as well by using active matrix circuits and thin film transistors. The TFT switching signals may be synchronized with the odd row-scanning signals of the display screen.

Figure 9:
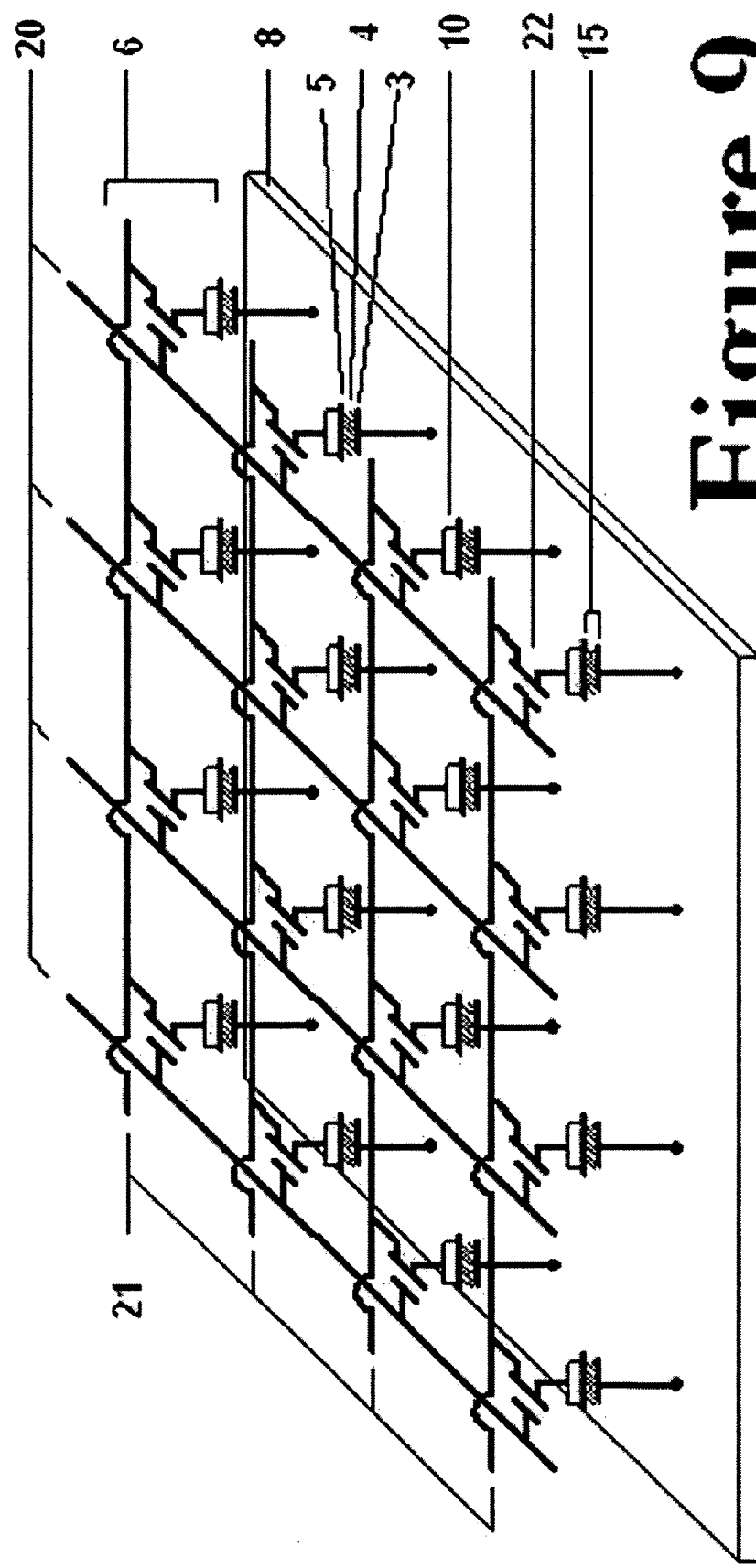
FIG. 9 illustrates the activate matrix circuitry and switching transistors TFTs used for dynamically controlling the polarizing direction of each unit on the DP Filter of FIG. 1 via the transparent electrodes.

FIG. 9 illustrates the activate matrix circuitry and switching transistors TFTs which may be used for dynamically controlling the polarizing direction of each unit 9 on DP Filter 14 via transparent electrodes 10. The switching signal conductors 20, the voltage signal conductors 21 and switching transistors 22, along with transparent electrodes 10 are formed as unit polarizing control layer 6 on the same glass substrate, either first substrate 7 or second substrate 2. LC sandwich structure 15 is formed between unit polarizing control layer 6 and common electrode layer 8. The voltage signals added on 21 is switched on or off by the switching signal applied on conductors 20, thus each unit 9 may be controllably applied the voltage signal and the polarizing direction on each unit may be individually controlled.

Figure 10:
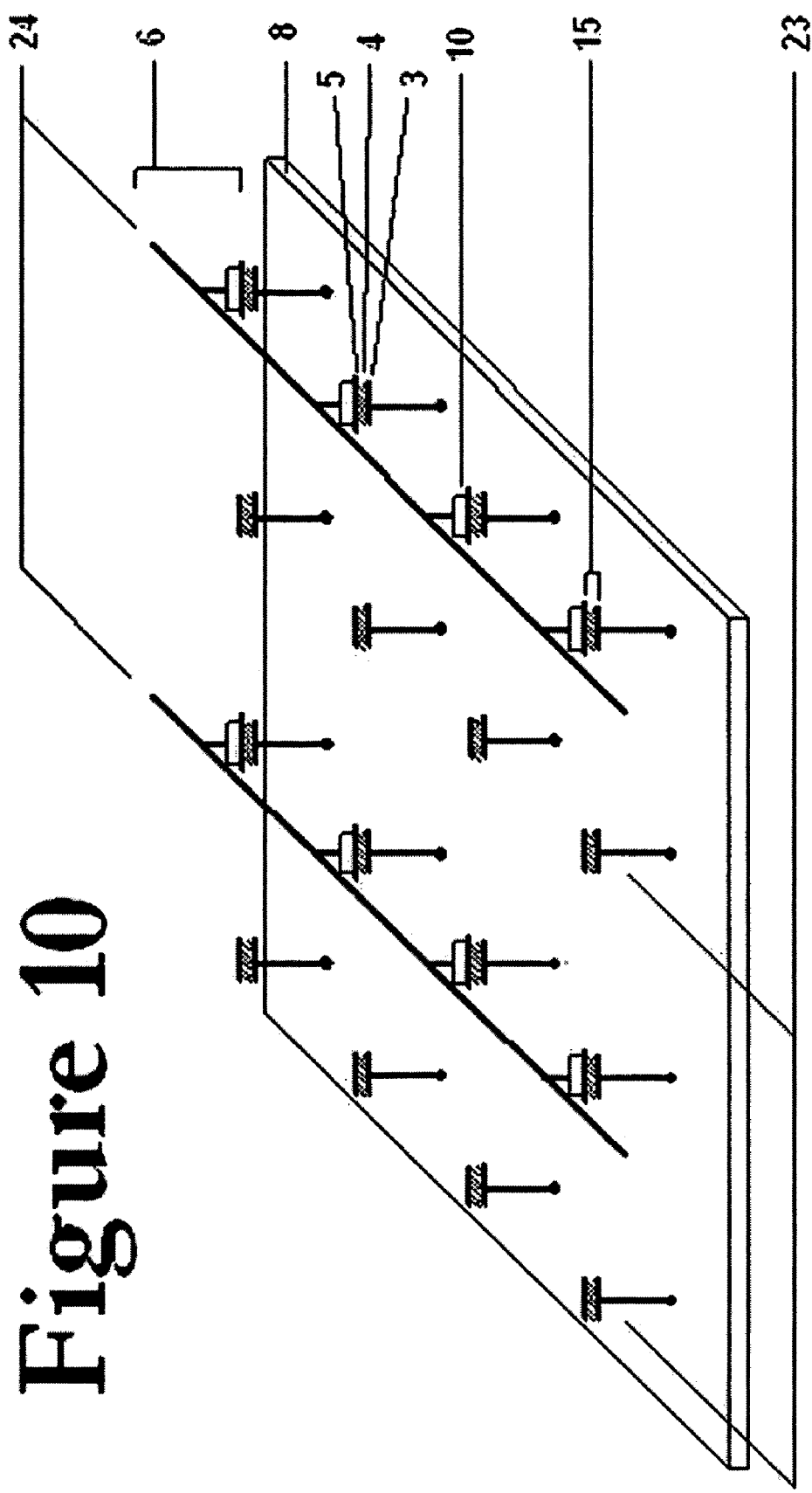
FIG. 10 illustrates how the static controlling circuitry for the transparent electrodes are formed on every other rows, or on every columns, for the embodiment of FIG. 8.

FIG. 10 illustrates static controlling circuitry for transparent electrodes 10 formed on every other row, which is illustrated in FIG. 8, or on every other column. Voltage conductors 24, along with transparent electrodes 10, combined as a unit polarizing control layer 6 are formed for odd rows or columns on the same glass substrate, either first substrate 7 or second substrate 2. No voltage conductors or transparent control electrodes are formed for the even rows or columns. LC sandwich structure 15 is formed between unit polarizing control layer 6 and common electrode layer 8. All voltage conductors 24 may be connected to a common static voltage source, thus the voltage is statically applied on all the units on the odd rows or columns of the DP Filter and thus maintains the polarizing direction of incident on those rows or columns. The light passes through all the units on the even rows is twisted 90 degrees at all times.

The DP Filter structures may have multiple alternative embodiments without affecting the underlying functionality. One example is that the unit polarizing control layer 6 and the common electrode layer 8 may have their positions switched.

Figure 11:
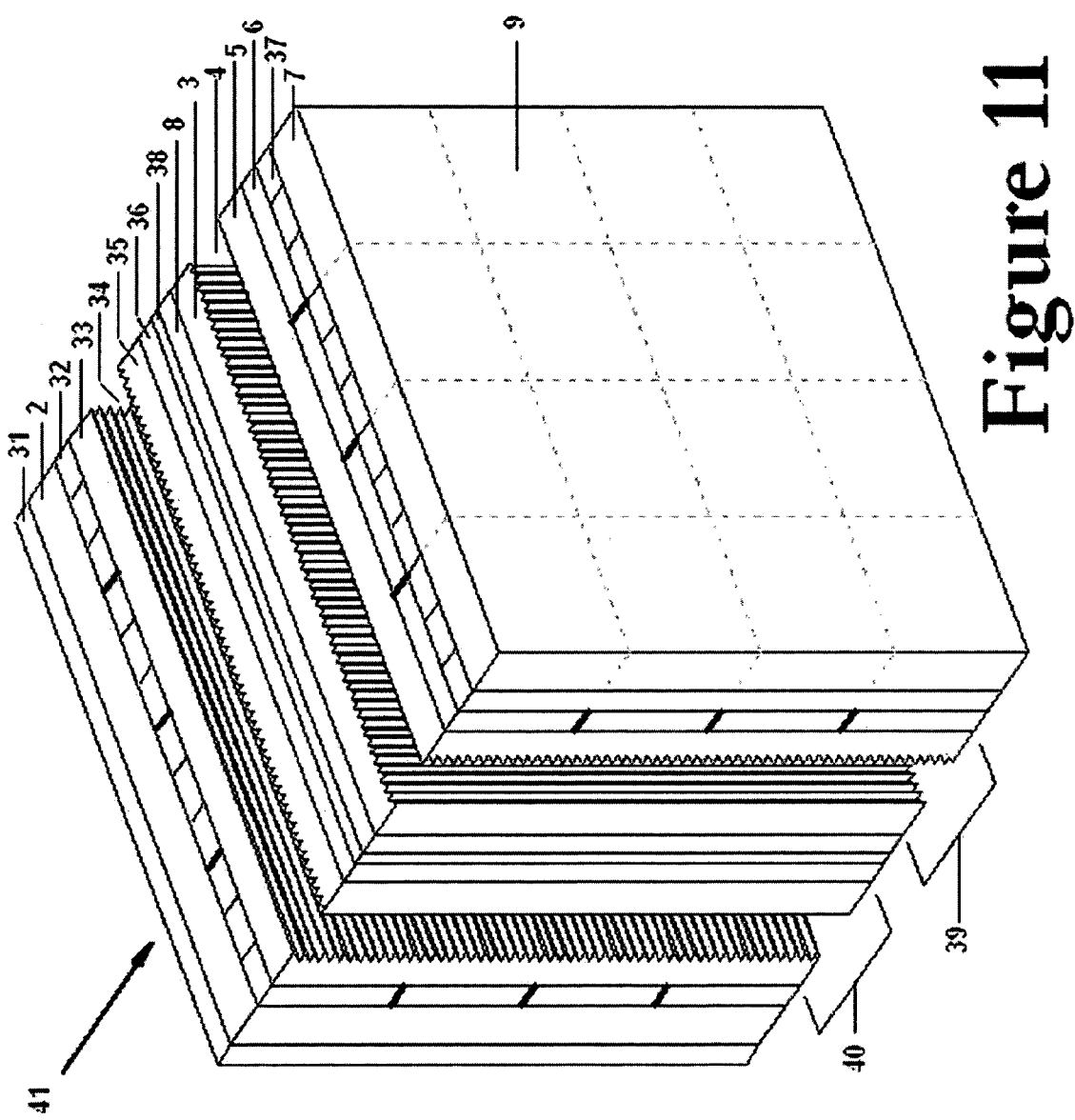
FIG. 11 is a perspective view of a uniform 2-D and 3-D LCD device integrated with the DP Filter of FIG. 1.

FIG. 11 is a perspective view of the embodiment of uniformed 2-D and 3-D LCD device that integrated with the DP Filter. First glass substrate 2 and second glass substrate 7 are facing and spaced apart from each other. A display pixel electrode layer 32, display LC sandwich structure 40, display common electrode layer 36, second linear polarizing film 38, component common electrode layer 8, component LC sandwich structure 39, component unit polarizing control layer 6, and display color filter layer 37 are subsequently formed between the inner surface of first glass substrate 2 and the inner surface of second glass substrate 7. A first linear polarizing film 31 is formed on the outer surface of first glass substrate 2.

First polarizing film 31 faces towards LCD backlight 41. The polarizing axis of the first polarizing film may be either vertical or horizontal. The horizontal polarizing axis of the first polarizing film in this example is selected to help explain this new type LCD structure as follows. Display LC sandwich structure 40 includes display first alignment layer 33 and display second alignment layer 35, with liquid crystal 34 filled in between. First alignment layer 33 may has horizontal grooves, which are parallel with the polarizing axis of first polarizing film 31. Display second alignment layer 35 may have vertical grooves which are perpendicular with the alignment grooves direction of layer 33.

Second polarizing film 38 has a vertical polarizing axis, which is perpendicular with the polarizing axis of first polarizing film 31. Component LC sandwich structure 39 includes component first alignment layer 3 and component second alignment layer 5, with liquid crystal 4 in between. Component first alignment layer 3 may have vertical grooves. Component second alignment layer 5 may have horizontal grooves, which is perpendicular with the alignment direction of layer 3.

Each pixel cell 9 has three transparent electrodes formed in layer 32, one transparent electrode formed in layer 6, and three color filters, which may comprise red, green, and blue, in layer 37. An active matrix circuit and TFT, which are not shown, are used to drive display LC sandwich structure 40. Thus electric conductors 20, 21, and switching transistors 22 are formed with transparent electrodes in layer 32. Depending upon the method chosen to drive component LC sandwich structure 39, the conductors and switching transistors comprising the different driving circuits are formed with transparent electrodes in layer 6. To maintain a uniform space between the alignment layers, spacers are used between layers 33 and 35, and between layers 3 and 5.

Layers 31, 32, 40, 36 and 38 together perform as a light shutter. The applied voltage, which is an image signal, applied to the transparent electrodes in layer 32 for each pixel cell decides whether backlight 40 is blocked or the amount of backlight 40 which may be passed through. Layers 8, 39, and 6 together form a light rotator, which has no affect to the color or brightness of the light illuminated from a cell. The voltage applied on the transparent electrodes in layer 6 for each pixel cell decides the polarizing direction of the light that is illuminated. Layer 37 provides the color of the light that is illuminated.

There are multiple alternative embodiments that may be employed within the spirit and scope of the present invention. For example, in an alternative embodiment, first polarizing film 31 may be rotated any degrees alpha along the light-passing axis, and correspondingly layer 38 may be rotated alpha degrees as well so the polarization axis of first polarizing film 31 and second polarizing film 38 maintains perpendicular. The "degree alpha" just means that the polarizing axis direction of liner polarizing film and the alignment direction of the alignment layer in LC sandwich can have any angle between them, and, between the alignment direction of LC sandwich for LCD panel and the alignment direction of LC sandwich for the DP filter can have any angle as well. In the Figures, a special case is illustrated, that is they are either parallel or perpendicular. Display LC sandwich structure 40 and component LC sandwich structure 39 may be rotated a different degrees along the light-passing axis as well. Different driving circuits may be employed and/or layer 37 may be moved to a different position, such as between 38 and 8, or between 36 and 38 and so forth.

At the application level, multiple pixel mixing and rendering patterns for the left and right images may be used. This may or may not affect the LCD structure as illustrated in FIG. 11. For example, using the mixing and rendering pattern mentioned in FIG. 8 may reduce the transparent electrodes amount in layer 6 and use the simplified driving circuit that mentioned in FIG. 10. It is also possible to apply a special coating at different layers for different purposes such as, but not limited to, achieving better light transfer or reducing surface reflection, or for more energy efficiency, better performance, or needs of fabrication process and the like.

There are multiple ways to combine the different structures of the DP Filter with different circuit driving methods and with the different image mixing and rendering patterns. It may be apparent to those skilled in the art that various modifications and variations may be made in the method of manufacturing a DP Filter of the presented invention. In addition the display device design may be integrated without departing from the spirit or scope of the invention. For example, in FIG. 1, first glass substrate 2 may be omitted when the DP Filter is integrated into a display device such as plasma TV.

Figure 2:
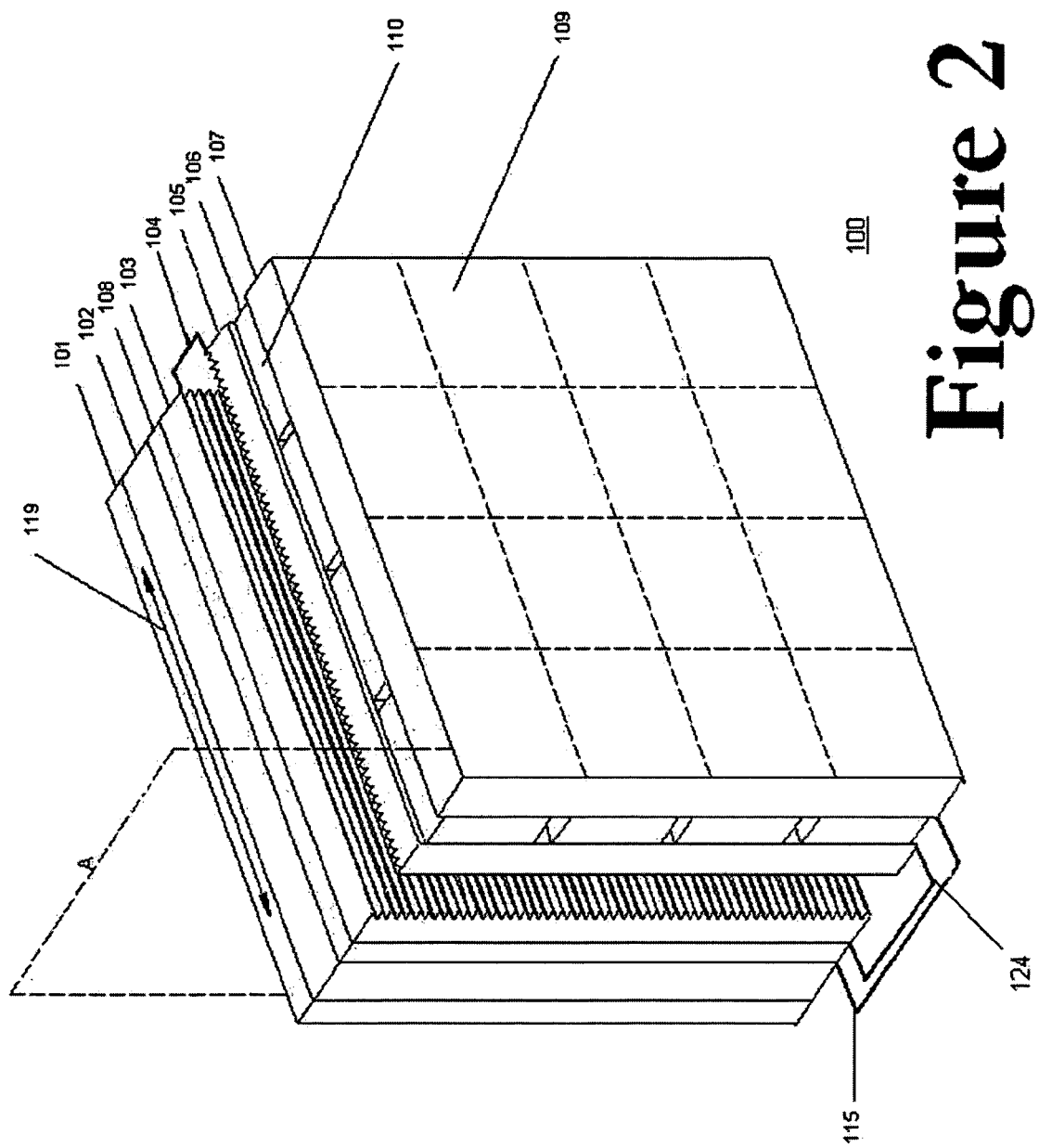
FIG. 2 is a perspective view of another embodiment of the DP Filter of the present invention.

FIG. 2 is a perspective view of second embodiment of DP Filter 100. DP filter 100 comprises of a first transparent substrate 102, a dual polarizing functional component 115, a second transparent substrate 107, and a linear polarizing film 101 attached to the outer surface of the first transparent substrate 102. Dual polarizing functional component 115 comprises a common electrode layer 108, an LC sandwich structure 124, and a dual polarizing control layer 106. LC sandwich structure 124 comprises a first alignment layer 103, a liquid crystal layer 104, a second alignment layer 105, with spacers (not shown) between the two alignment layers to insure uniform spacing between alignment layers 103 and 105. First substrate 102 and second substrate 107 are facing and spaced apart from each other. Dual polarizing functional component 115 is formed between substrate 102 and substrate 107. A common electrode layer 108 is formed on the inner surface of first substrate 102. A unit polarizing control layer 106 is formed on the inner surface of second substrate 107. Liquid crystal sandwich structure layer 124 is formed between unit polarizing control layer 106 and common electrode layer 108. An optional linear polarizing film 101, with polarizing axis direction 119, is formed on the outer surface of first substrate 102. When incident light from first substrate 102 is polarized, linear polarizing film 101 may be omitted.

LC layer 124 has a first alignment layer 103 and a second alignment layer 105 with liquid crystal 104 filled in between them. To maintain uniform spacing between first alignment layer 103 and second alignment layer 105, a spacer, (not shown) may be used between first alignment layer 103 and second alignment layer 105. First alignment layer 103 and second alignment layer 105 each have grooves formed on their inner surfaces as shown. First alignment layer 103 and second alignment layer 105 have grooves formed in directions perpendicular to one another.

Unit polarizing control layer 106 may comprise transparent electrodes and electrical conductors including switching transistor units, (not shown) which control voltage applied on the transparent electrodes. Each transparent electrode 110 is formed in the space divided by the electrical conductors and joins the electrical conductors by the switching transistor units. Each transparent electrode 110 may define a functional and individually controllable DP unit 109.

Figure 4:
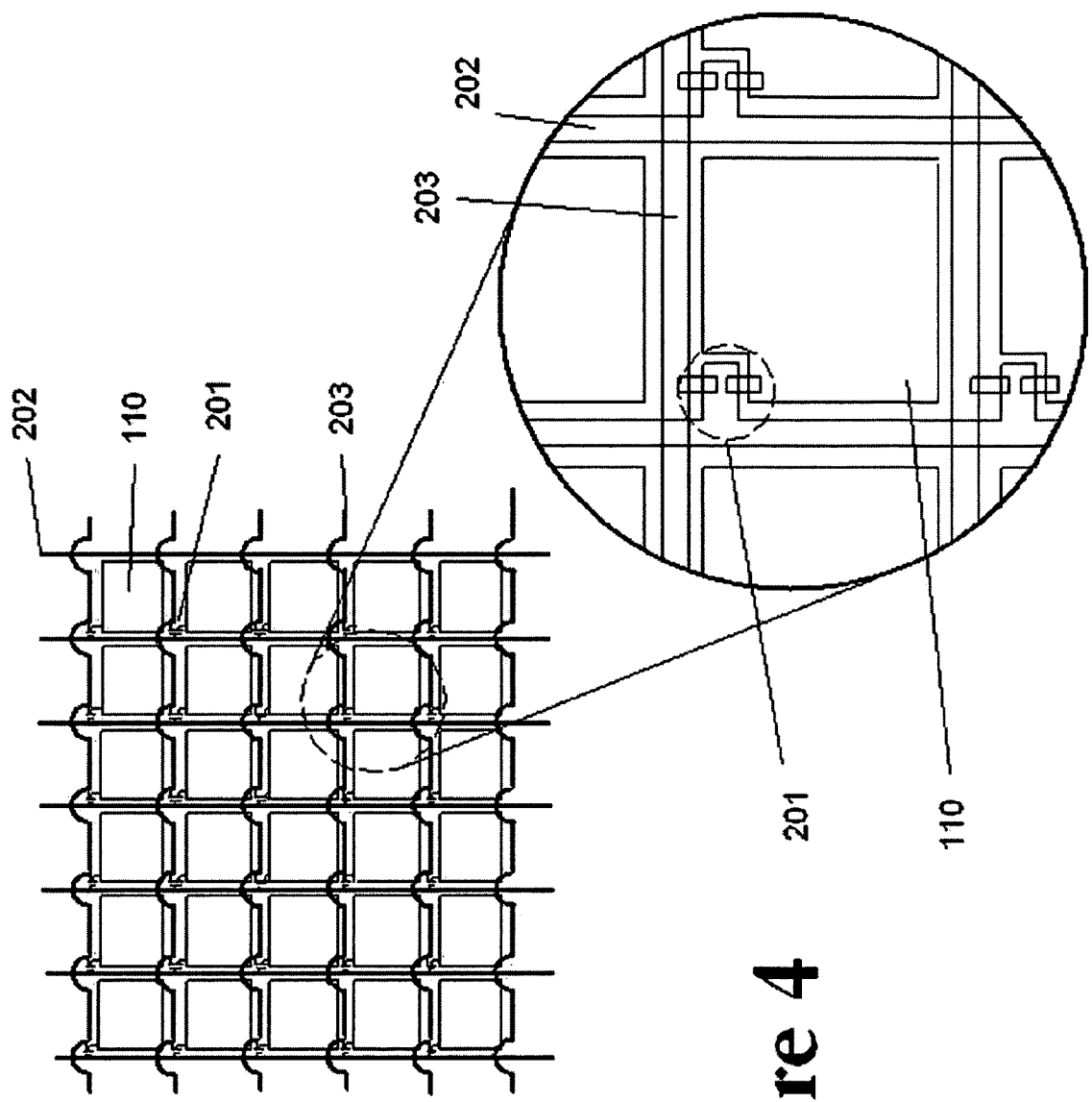
FIG. 4 is illustrates the unit polarizing control layer 106 of FIG. 2.

FIG. 4 illustrates the unit polarizing control layer which was illustrated as element 106 in FIG. 2, which provides dynamic voltage control on each individual electrode and thus drives the liquid crystal (element 104 in FIG. 2) with the common electrode layer (element 108 in FIG. 2) to maintain or twist the polarizing direction of polarizing light passing through LC layer 104, thus controlling the polarizing direction of the illuminated light from DP Filter 100. The polarizing control layer of FIG. 4 comprises transparent electrodes 110 and the driving circuit, which comprises voltage signal conductors 203, switching signal conductors 202 and switching transistors 201, connecting transparent electrodes 110 and the circuit conductors.

The arrangement of transparent electrodes 110 and the driving circuit illustrated in FIG. 4 is only one of many possible combinations of different electrode arrangements and different driving circuits. Depending upon the method used to drive LC layer 104, the usage of the DP filter (element 100 in FIG. 2) and the image light incident into the DP filter, different driving circuits and electrode arrangement may be selected to form unit polarizing control layer 106. The spacing of each transparent electrode 110 corresponds to the spacing of each unit of the DP filter (element 109 in FIG. 2).

Figure 12:
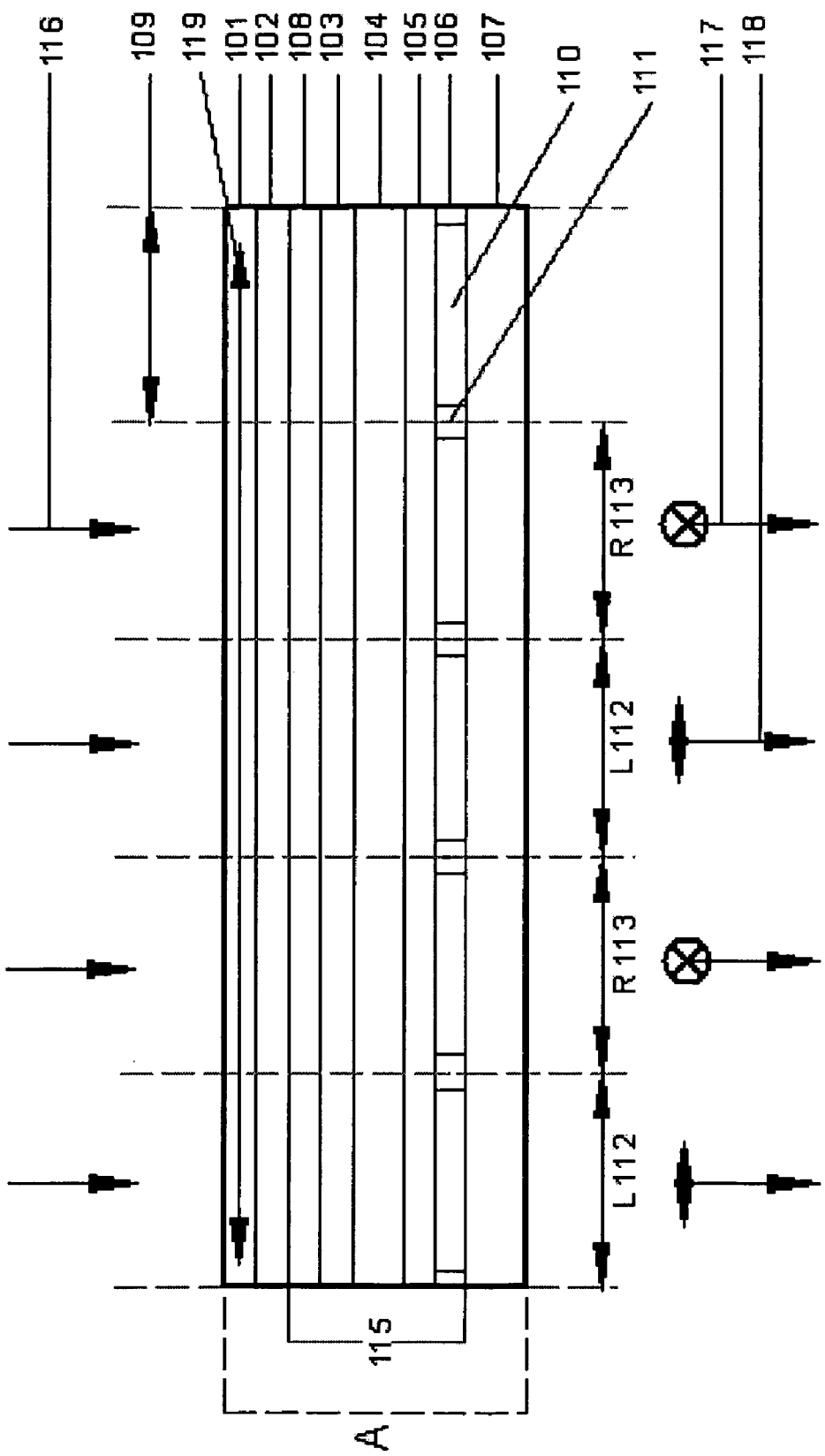
FIG. 12 is a sectional view of the DP filter from line "A" in FIG. 2 with the incident light from side of first substrate 102.

FIG. 12 is a sectional view of the DP filter as viewed along line "A" in FIG. 2. Transparent electrodes 110 on unit polarizing control layer 106 defines an individual unit 109 on DP filter 100. The individual units may be differentiated to be two types, L units 112 and R units 113. An L unit has voltage applied on its transparent electrode 110 and an R unit does not have a voltage applied on its transparent electrode. Liner polarizing film 101 is polarized in direction 119.

When regular incident light 116 coming from liner polarizing film 101 enters DP filter 100, it becomes polarized light after passing through linear polarizing film 101. The polarizing direction of this light is the same as polarizing axis direction 119. When this polarized light passes through DP filter functional component 115, the polarizing direction maintains unchanged in L units 112 where voltage is applied on transparent electrodes 110. The polarizing direction is twisted 90 degrees in R units 113 where voltage is not applied on the transparent electrodes 110. Thus the light passing through the different units of DP filter 100 may have two different polarizing directions 117 and 118, perpendicular to one another.

Figure 13:
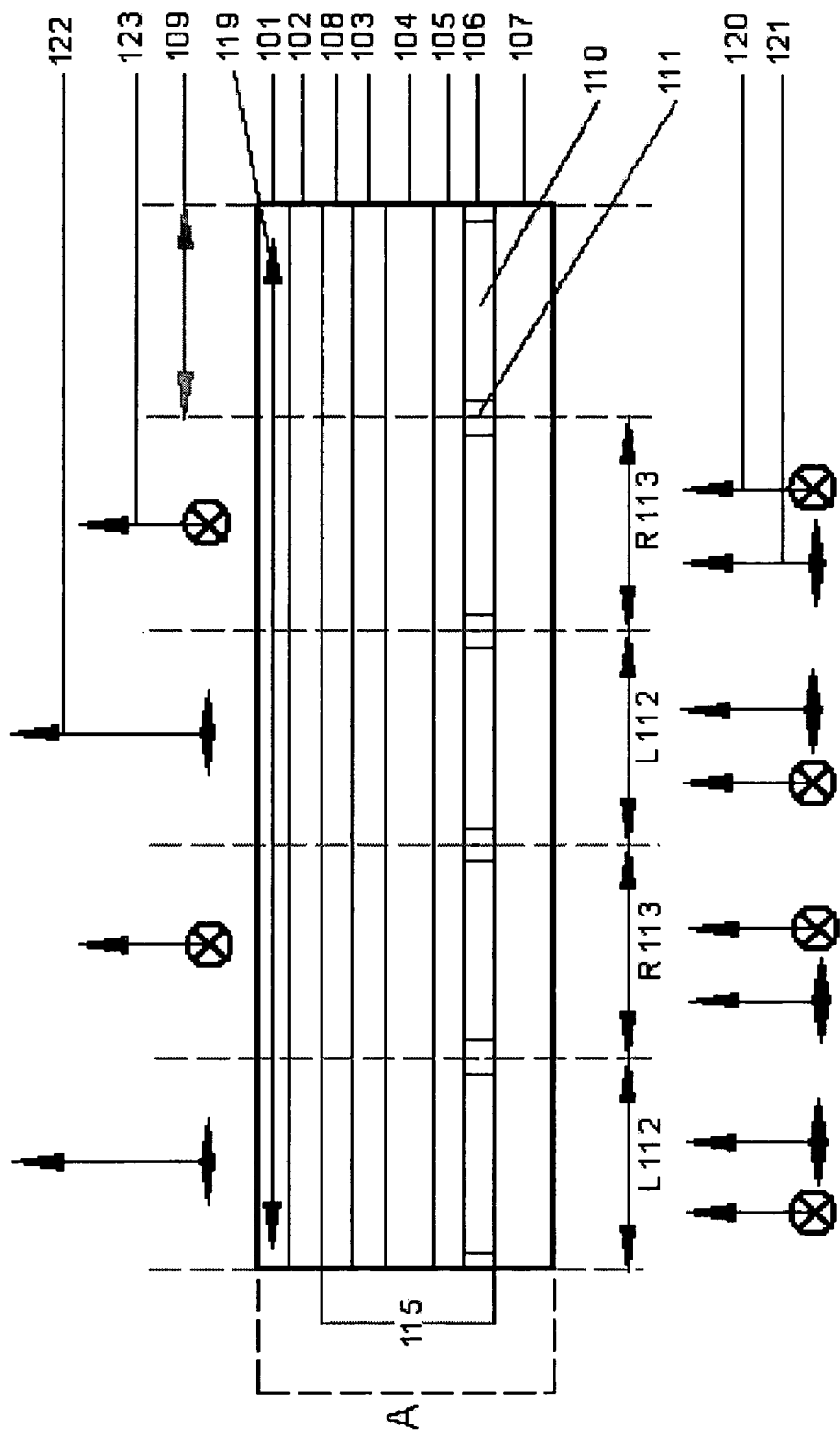
FIG. 13 is another sectional view of the DP filter as in FIG. 12 with the incident light from side of second substrate 107.

FIG. 13 is another sectional view of the DP filter of FIG. 12. Incident light, which is mixed of two polarizing light beams 120 and 121 having polarizing directions perpendicular to one another, comes from second substrate 107. Incident light 121 has a polarizing direction 119, which is in the same polarizing axis direction of polarizing film 101. Incident light 120 has its polarizing direction perpendicular to direction 119. When the light passes through DP filter functional component 115, both incident light 120 and 121 maintain their original polarizing directions in L units. Polarizing film 101 blocks polarizing light 120, thus illuminated light 122 from L unit 112 at the first substrate side is incident light 121. Meanwhile, both incident light 120 and 121 are twisted 90 degrees in R units 113 when they pass through DP filter functional component 115. Polarizing film 101 blocks polarizing light 121 thus illuminated light 123 from R unit 113 at the first substrate side is incident light 120. Thus the DP filter selectively lets polarizing light with a perpendicular orientation pass through on different units.

Figure 14:
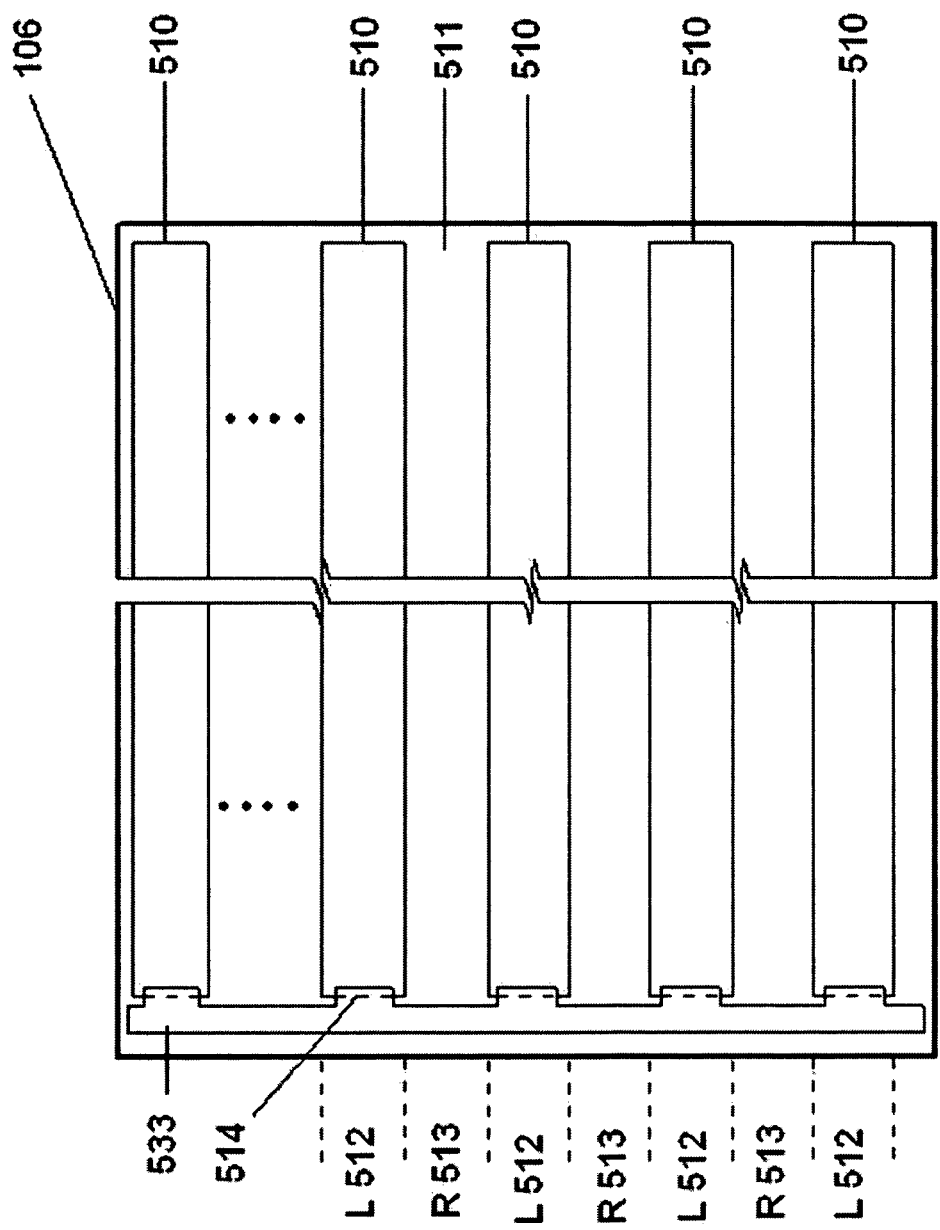
FIG. 14 is a schematic view of one simplified the unit polarizing control layer 106 in FIG. 2, where the voltage may be statically applied on the formed electrodes and drives the LC with the common electrode layer (element 108 in FIG. 2).

FIG. 14 is a schematic view of one simplified the unit polarizing control layer 106, where the control voltage may be statically applied on the formed electrodes and drives the LC with the common electrode layer (element 108 in FIG. 2). In FIG. 14, all the L units (element 112 in FIG. 12) and R units (113 in FIG. 12) are arranged and formed in separate lines and these L unit lines and R unit lines are arranged alternately. Transparent electrode line 510 is formed on second substrate (107 in FIG. 2) continuously in the space for those units on the same line. These electrode lines are evenly distributed across unit polarizing control layer 106. The space where transparent electrodes are formed comprises L sections 512 and the space without transparent electrodes comprises R sections 513 of the DP filter.

Electrical conductors 533 are formed at the edge of the second substrate (element 107 in FIG. 2) and connect to the transparent electrodes by conductors 514. When a voltage is statically applied on electrical conductor 533, the voltage is passed to all transparent electrode lines 510 thus LC layer 104 may be driven by transparent electrode lines 510 and the common electrode layer (element 108 in FIG. 2). With the voltage applied, the polarizing light passes through DP filter functional component (element 115 in FIG. 12) maintains its polarizing direction on all the unit lines where the electrode is formed and twists its polarizing direction on all the unit lines where the electrodes are not formed.

The electrode layout in FIG. 14 may be altered to have the second substrate (element 107 in FIG. 2) completely covered by the transparent electrode. This layout turns the DP filter (element 100 in FIG. 2) into a single cell filter. Thus the DP filter may change the polarizing direction of the light passing through at different times or block the polarized incident light of different directions at different times by controlling the static voltage on the electrode.

Figure 23:
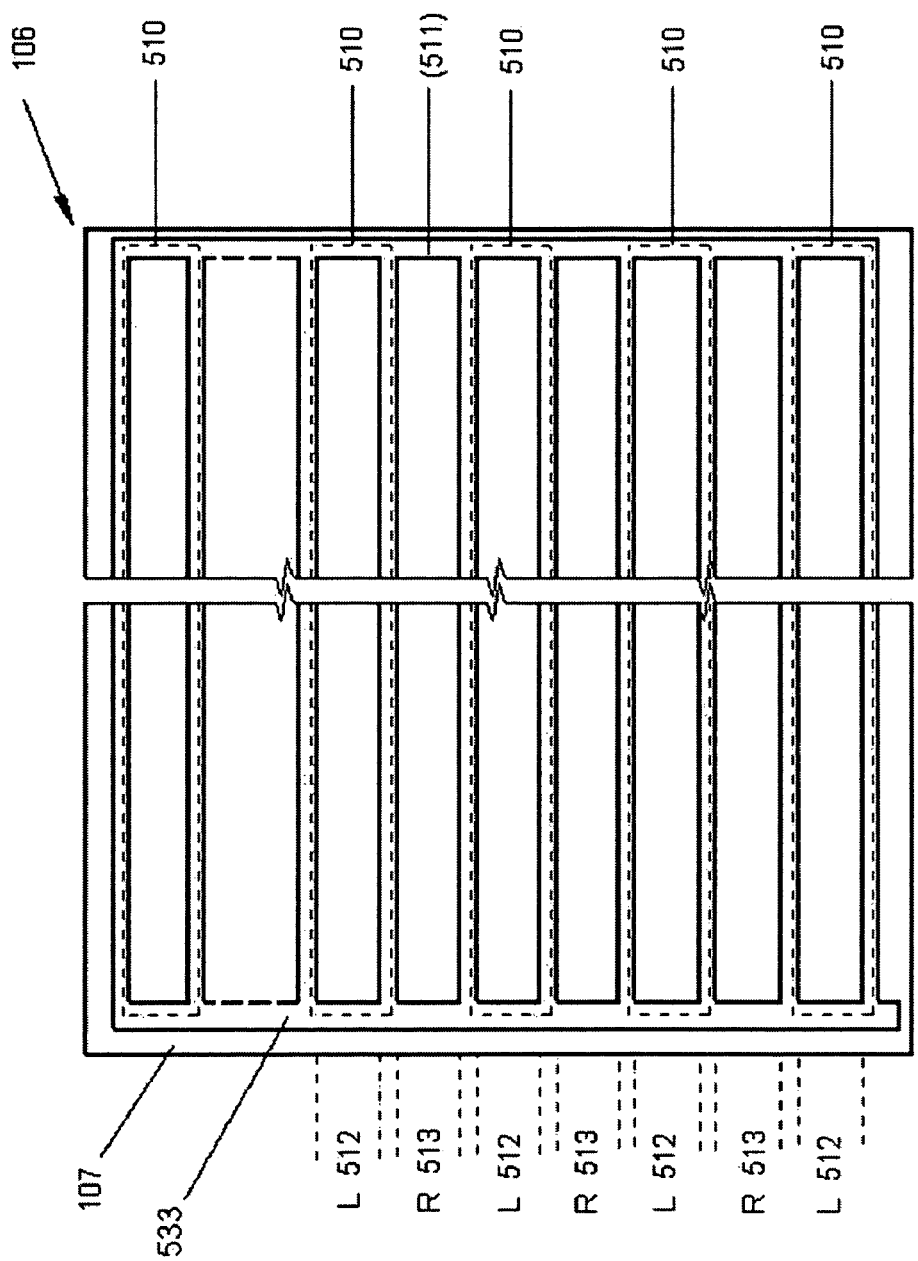
FIG. 23 illustrates an alternative method to that of FIG. 14, for constructing a dual polarizing control layer for better performance and higher transparency of the transparent electrode material

FIG. 14 discloses one embodiment of the present invention, but is not a limitation of the dual polarizing control layer. Depending upon the application and manufacturing process, the structure may be altered without affecting the functionality of the dual polarizing control layer. FIG. 23 illustrates an alternative method to that of FIG. 14, for constructing a dual polarizing control layer for better performance and higher transparency of the transparent electrode material including, but not limited to, ITO (Indium Tin Oxide) films and the like. In FIG. 23, transparent electrodes 510 are formed on second substrate 107 in a similar manner to FIG. 14. However, electrical conductors 533 may be formed along with each strip areas. Electrical conductors 533 are directly attached with transparent electrodes 510 formed underneath or are connected to transparent electrodes 510 via conductors at multiple points along the stripped electrodes. Thus functional L strip region 512 and functional R strip region 513 are the areas not covered by electrical conductors 533.

Figure 15:
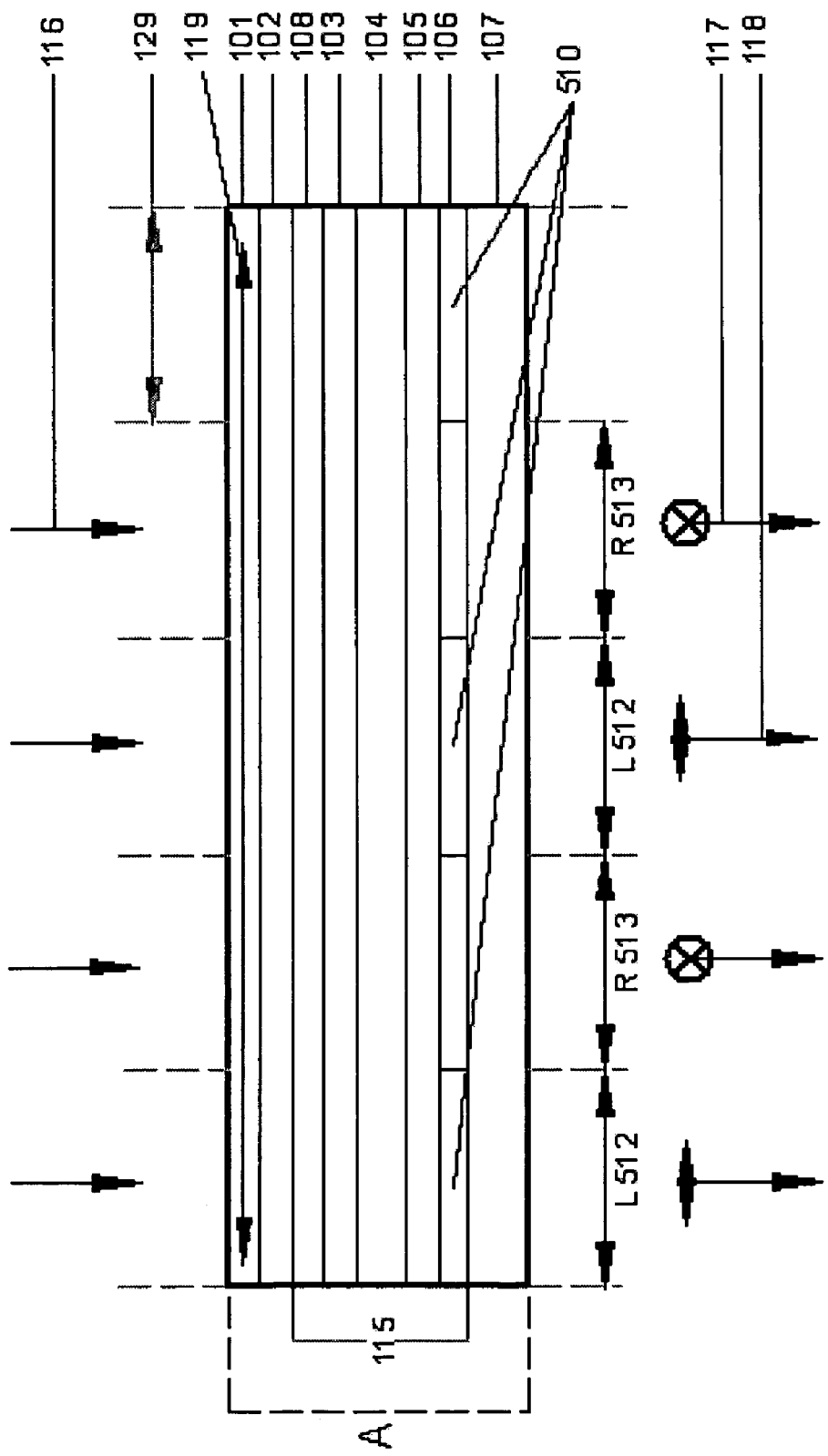
FIG. 15 is a sectional view of the invention with the unit polarizing control layer 106 of FIG. 14 with the incident light from side of first substrate 102.

FIG. 15 is a sectional view of the invention with the unit polarizing control layer 106 of FIG. 14. Transparent electrodes 510 are formed on second substrate 107 and evenly divide the space of the second substrate. Transparent electrodes 510 and the space between them construct dual-polarizing line unit areas 129. The spaces without electrodes are R areas 513 and the spaces with electrodes are L areas 512. In L area 512, the static voltage applied on the electrodes drives the LC in this area, thus the polarizing light passes through it and maintains its polarizing direction. In R area 513, there is no voltage applied, thus the polarizing direction is always twisted 90 degrees when polarizing light passes through LC 104. So when regular light 116 is incident into the DP filter from polarizing film 101, illuminating light 117 and 118 from the second substrate side has perpendicular polarizing directions in area R 513 and area L 512 respectively.

Figure 16:
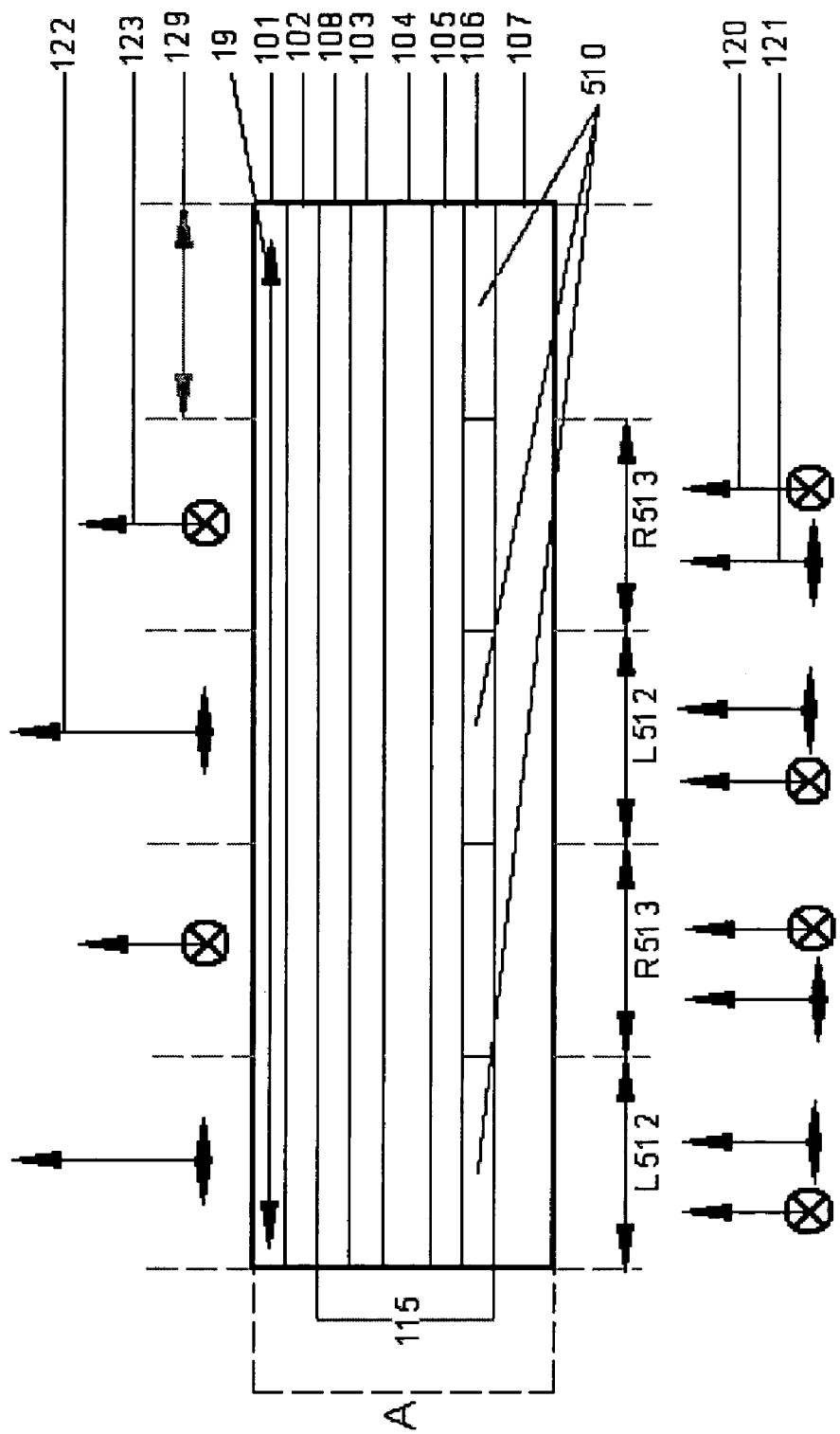
FIG. 16 illustrates the same section view of the DP filter structure illustrated in FIG. 15 with the incident light from side of second substrate 107.

FIG. 16 illustrates the same section view of the DP filter structure as illustrated in FIG. 15, with incident light from side of second substrate 107. When the control voltage is statically applied on transparent electrode lines 510, two polarizing light 120 and 121 with relative perpendicular polarizing directions incident into the DP filter may be selectively passed through the DP filter on different line shaped areas. Polarizing light 120 passes through and illuminates from R areas 513 at polarizing film 101 and becomes illuminated light 123 and twists its original polarizing direction by 90 degrees. Polarizing light 121 passes through and illuminates from L areas 512 at polarizing film 101 and becomes illuminated light 122 while maintains its original polarizing direction.

Figure 17:
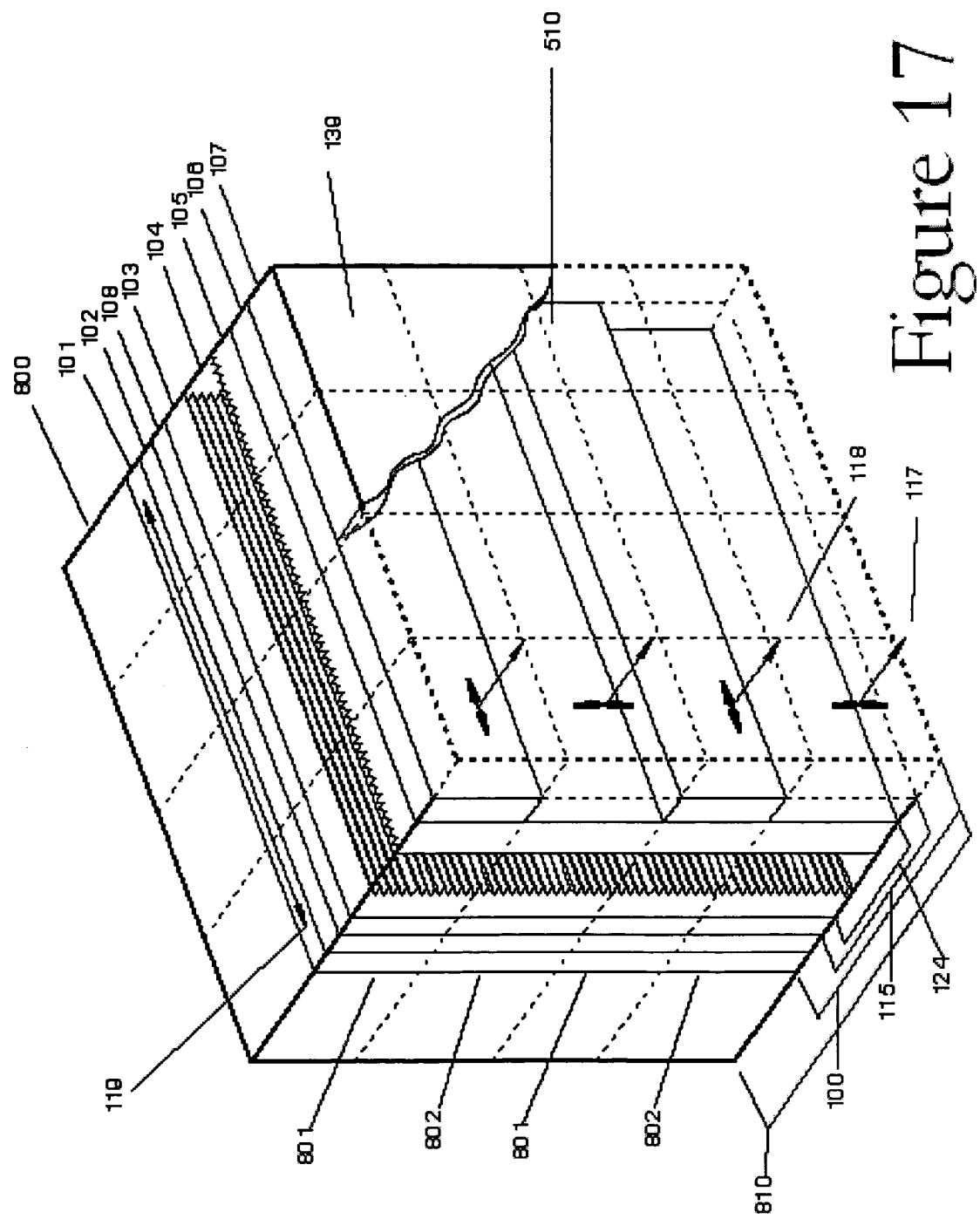
FIG. 17 is a perspective view of a 3-D monitor using DP filter, in which the second substrate 107 is partially removed to illustrate the structure of the unit polarizing control layer 106.

FIG. 17 is a perspective view of a 3-D monitor using DP filter, in which second substrate 107 is partially removed to illustrate the structure of the unit polarizing control layer 106. In FIG. 17, display screen 800 illustrates regular light on each ordinary pixel cell. The image rendered on the display screen is in a particular way, that is the left image and the right image are overlapped and rendered to different lines of the display screen, say the left image pixels are rendered on odd display lines 801 and the right image pixels are rendered on even display lines 802. In FIG. 17, the electrode layer described in FIG. 14 is used as the unit polarizing control layer 106. Every electrode line (510 in FIG. 14) formed on second substrate 107 is aligned with odd display lines 801 one by one. A control voltage is statically applied on all the electrodes at all the time.

Light illuminated from display screen 800 becomes polarized light having polarizing direction 119 after passing through polarizing film 101. Light from odd display lines maintains its polarizing direction when passing through DP filter functional component 115 and illuminated out from the second substrate 107 as 118. Light from even display lines is twisted 90 degrees when passed through DP filter functional component 115 and illuminated out from second substrate 107 as 117. Thus left image pixels are represented as light of one polarizing direction and right image pixels are represented as light of another polarizing direction. The polarizing directions of the two illustrated lights are perpendicular to each other. These perpendicular polarized lights may be separated by a pair of polarizing glasses, and thus reach an observer's left and right eyes, respectively to create a 3-D effect.

FIG. 17 describes only one possible structure and image rendering combination based on the invention. For example, using the unit polarizing control layer structure described in FIG. 2, or the alternation electrode layout described in connection with FIG. 14, which is one continuous electrode covering the whole second substrate, it may be possible to render the left and right image frames alternately on display screen 800. Synchronizing the image frame signal on display 800 with the voltage signals applied on the electrode(s), such the voltage is applied on all the electrode(s) only when the left image is rendering on the display 800. The left image may be delivered in the light of one direction and the right image may be delivered in the perpendicular direction. When the left and right image altered on display 800 fast enough, observers eye may not differentiate the left and right image frame switching (e.g., flicker) and see the 3-D vision.

Figure 18:
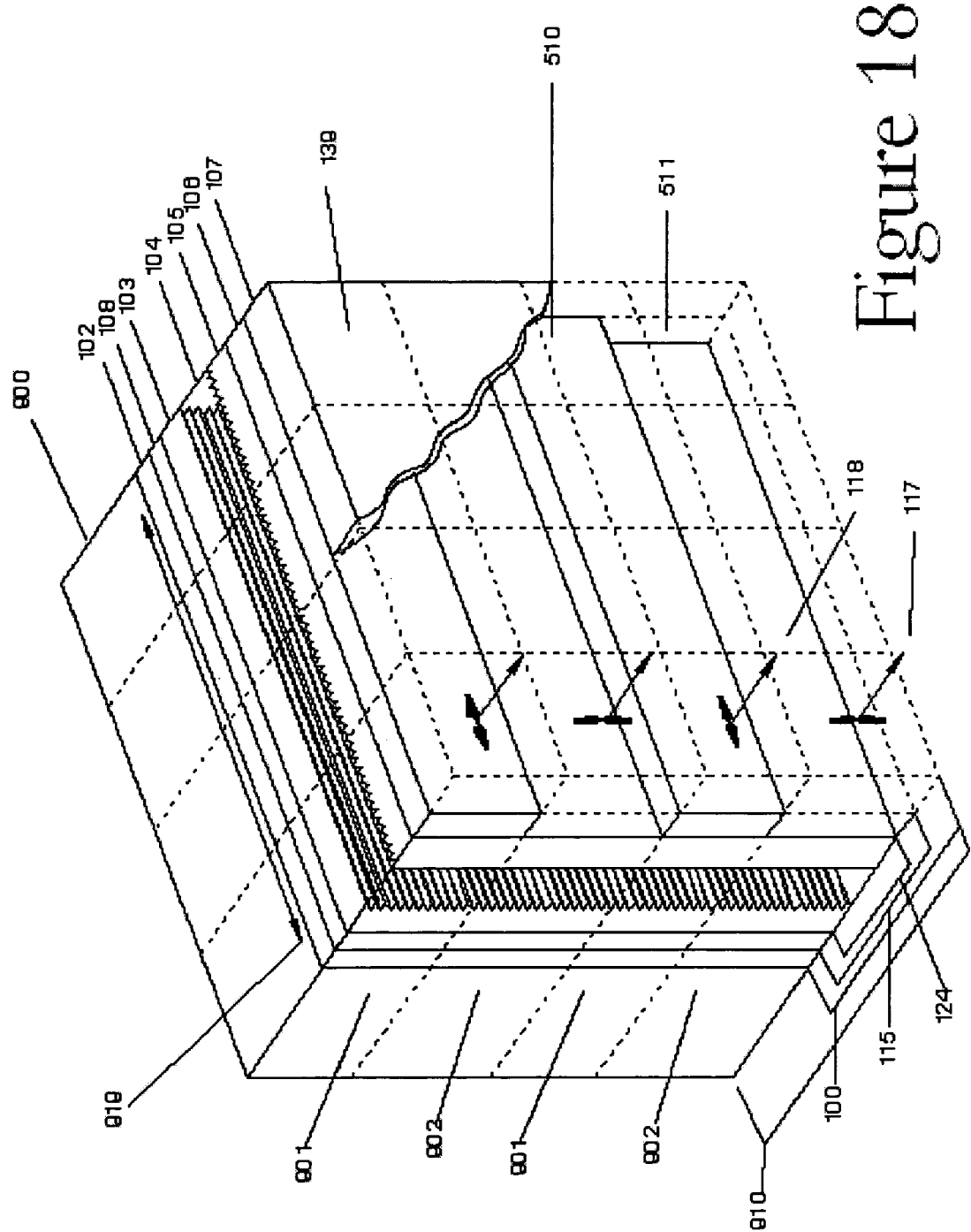
FIG. 18 is a perspective view of a 3-D monitor using DP filter without optional polarizing film 1 of FIG. 1, in which second substrate 107 is partially removed to illustrate the structure of unit polarizing control layer 106.

FIG. 18 is a perspective view of a 3-D monitor using DP filter, in which second substrate 107 is partially removed to illustrate the structure of unit polarizing control layer 106. In FIG. 18, display screen 900 illustrates polarizing light in polarizing direction 919 on each ordinary pixel cell. The alternative polarizing film (101 in FIG. 2) is omitted in FIG. 18. The groove direction of the first alignment layer 103 and the groove direction of the second alignment layer 105 are perpendicular to one another. In FIG. 18, unit polarizing control layer 106, image rendering on display 900 and other structure features are similar to those described in FIG. 17. Obviously, the way of constructing the polarizing control layer and the methods of rendering the stereoscope images are not limited to what is demonstrated here.

Figure 19:
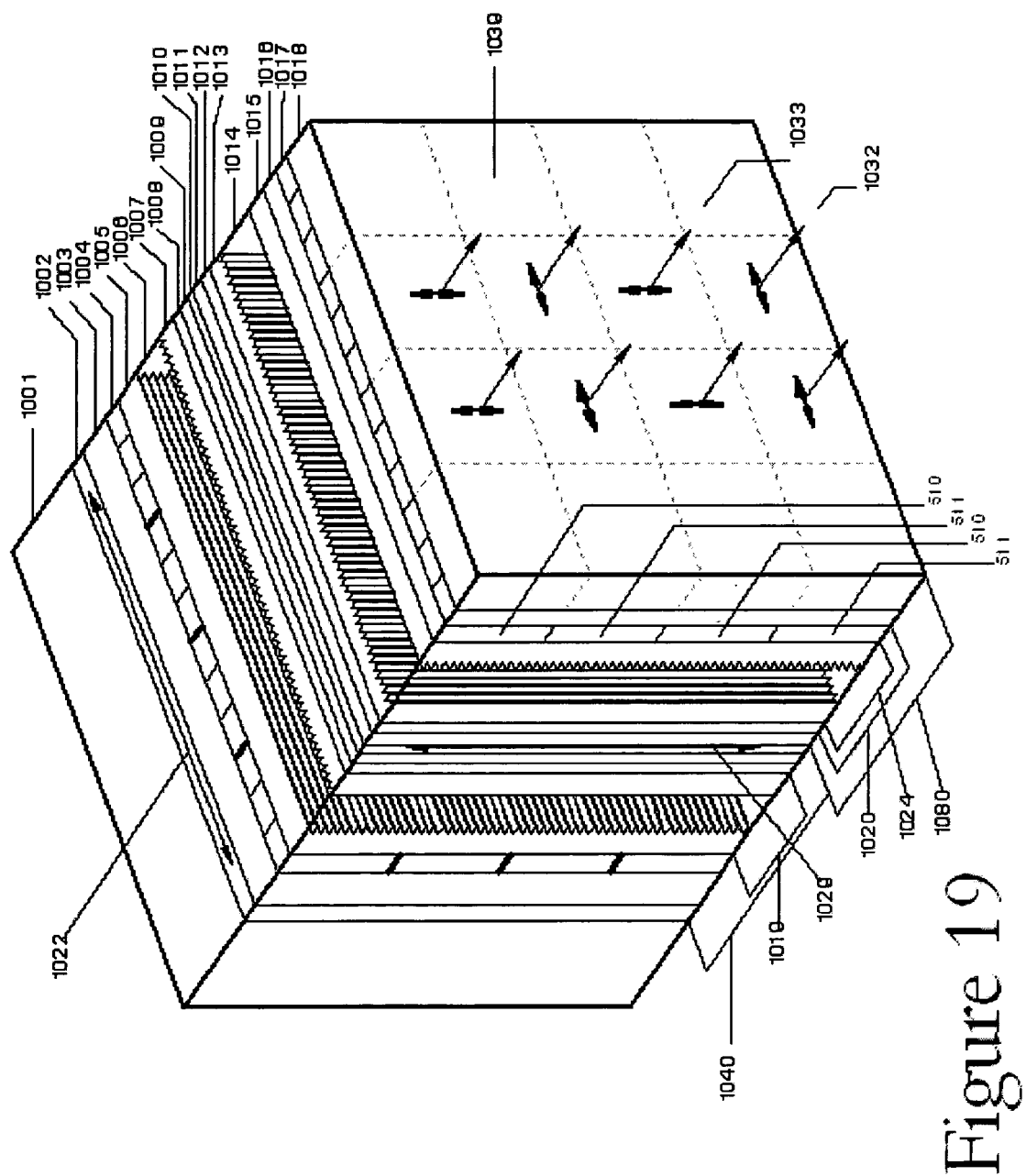
FIG. 19 is a perspective view of an embodiment of a uniform 2-D and 3-D LCD display device with an integrated DP filter.

FIG. 19 is a perspective view of an embodiment of a uniform 2-D and 3-D LCD display device with an integrated DP filter. In FIG. 19, device 1000 comprises three major components, back light unit 1001, LCD panel unit 1040, and DP filter unit 1080. LCD panel unit 1040 and DP filter unit 1080 are aligned pixel-by-pixel and attached together after the manufacturing process. LCD panel 1040 comprises a first linear polarizing film 1002, a first transparent substrate 1003, a signal control electrode layer 1004, a first LC sandwich layer 1019, a common electrode layer 1008, a first transparent thin substrate 1009, and a second linear polarizing film 1010. First linear polarizing film 1002 has a polarizing axis direction 1022 and second linear polarizing film 1010 has a polarizing axis direction perpendicular to 1022. First LC sandwich layer 1019 comprises a first alignment layer 1005, a liquid crystal layer 1006 and a second alignment layer 1007, with spacers (not shown) between the two alignment layers to insure uniform space between alignment layers 1005 and 1007.

The groove direction of first alignment layer 1005 and the groove direction of second alignment layer 1007 are perpendicular to one another. Signal control electrode layer 1004 comprises transparent electrodes and electrode conductors (not shown) connected to each electrode by switch transistors, such as TFT. In every pixel cell 1039, there are three individual electrodes formed to independently control one of the R, G, and B colors for that pixel cell. LCD panel unit 1040 may be typically viewed as a regular LCD panel without a color filter layer.

This LCD panel unit may be constructed in a way a little different than a regular LCD panel. Signal control electrode layer 1004 is formed on the inner surface of first transparent substrate 1003, which may be a glass substrate. First alignment layer 1005 may then be formed on top of signal control electrode layer 1004. First transparent thin substrate 1009, which may be a transparent film, is attached to a temporary glass substrate. Treat the temporary glass substrate with the thin substrate attached as a regular glass substrate and form the common electrode layer 1008 on first thin substrate 1009 and then second alignment layer 1007 on the top of common electrode layer 1008. Put the spacer between the two alignment layers and seal the two completed side together and fill in the liquid crystal material. Form first polarizing film 1002 on the outer surface of first substrate 1003, detach and remove the temporary glass substrate from the first thin substrate and form second polarizing film 1010 on the outer surface of first thin substrate 1009.

The DP filter unit comprises a second thin substrate 1011, a DP filter functional component 1020, a color filter layer 1017, and a second transparent substrate 1018. DP filter functional component 1020 comprises a common electrode layer 1012, a LC sandwich structure 1024, and dual polarizing control layer 1016. LC sandwich structure 1024 has the same structure layout as 1019, comprising a first alignment layer 1013, a liquid crystal layer 1014, a second alignment layer 1015, with spacers (not shown) between the two alignment layers to insure uniform spacing between the two alignment layer 1013 and 1015. The direction of the grooves in third alignment layer 1013 is equivalent to first alignment layer 1005 in the LCD panel unit. The direction of the grooves in fourth alignment layer 1015 is equivalent to second alignment layer 1007. Grooves in the third and fourth alignment layers are perpendicular to one another. Polarizing control electrode layer 1016 comprises voltage conductors and transparent electrodes formed on every other pixel rows; for example, all odd pixel rows. Thus, like the embodiment of FIG. 14, odd pixel rows become the L area (512 in FIG. 14) where polarizing light passing through maintains a polarizing direction and even pixel rows becomes the R area (513 in FIG. 14) where polarizing light passing through twist its direction by 90 degrees. Each pixel unit composes three different color filters on color filter layer 1017 in the space of a pixel cell 1039. They are aligned and mapped to three signal control electrodes in the signal control electrode layer 1004 for the same pixel cell to deliver different color and brightness on this pixel cell.

This DP filter unit may be constructed in the similar way the LCD unit is constructed. Color filter layer 1017 may be formed on the inner surface of second substrate 1018, which may be a glass substrate. Polarizing control electrode layer 1016 may then be formed on top of color filter layer 1017 and then fourth alignment layer 1015. Second transparent thin substrate 1011, which may be a transparent film like first thin substrate 1009, may be attached to a temporary glass substrate. Treat the temporary glass substrate with the second thin substrate attached as a regular glass substrate and form common electrode layer 1012 on second thin substrate 1011 and then third alignment layer 1013 on the top of common electrode layer 1012. Put the spacer between the two alignment layers and seal the two completed side together and fill in the liquid crystal material.

Detach and remove the temporary glass substrate from second thin substrate 1011 and assembler LCD unit 1040 and DP filter unit 1080 together so that second polarizing film 1010 of the LCD unit and second thin substrate 1011 of the DP filter unit are face to face attached together and the pixel cells on the LCD unit and on the DP filter unit are aligned by lines and by columns. Finally attach back light unit 1001 to first polarizing film 1002 to form a complete display panel 1000.

Layers 1002, 1004, 1019, 1008, and 1010 together acts as a light shutter. The voltage, which represents the image signal, applied on transparent electrodes in layer 1004 for each pixel cell decides whether light from backlight unit 1001 is blocked or the amount of back light that may be passed through. Light passing through LCD unit 1040 and illuminated from linear polarizing film 1010 is always polarized in a direction perpendicular to 1022. Layer 1020 acts as a light rotator, which has no affect to the strength of the light illuminated from polarizing film 1010, thus no affect on the color or brightness of the light illuminated from second glass substrate 1018. Only the polarizing direction of the light illuminated out is twisted 90 degrees on those pixel cells where the transparent electrodes are not formed in polarizing control electrode layer 1016. Color filter layer 1017 provides the color of the light that is illuminating out of glass substrate 1018 for every pixel cell. When left and right images are interlaced and the left image is rendered to the odd pixel rows and the right image is rendered to the even pixel rows, the light representing them from LCD device 1000 comprises two perpendicular polarizing lights 1033 and 1032.

There are multiple alternatives of this embodiment within the spirit and scope of the present invention, serving the same purpose or function of this new type LCD device. For example, color filter layer 1017 may be moved to different position; thin substrates 1009 and 1011 may be removed when using different construction methods other than the one described above. The position of signal control electrode layer 1004 and its corresponding common electrode layer 1008 may be switched. The position of polarizing control electrode layer 1016 and its corresponding common electrode layer 1012 may be switched as well. There is no restriction on what type of driving circuits may be used in signal control electrode layer 1004 and polarizing control electrode layer 1016. Polarizing control layer 1016 may use different layouts to form the electrodes and using different driving circuits for different image signal mixing and rendering. For instance rotating the polarizing control electrode layers as described above by 90 degree may support the left and right image rendering altered on every other pixel column instead of every other pixel row. In addition, special coatings may be applied at different layers for different purposes like, but not limited to, achieving better light transfer or reducing surface reflection, or for more energy efficiency or better performance and the like.

Figure 20:
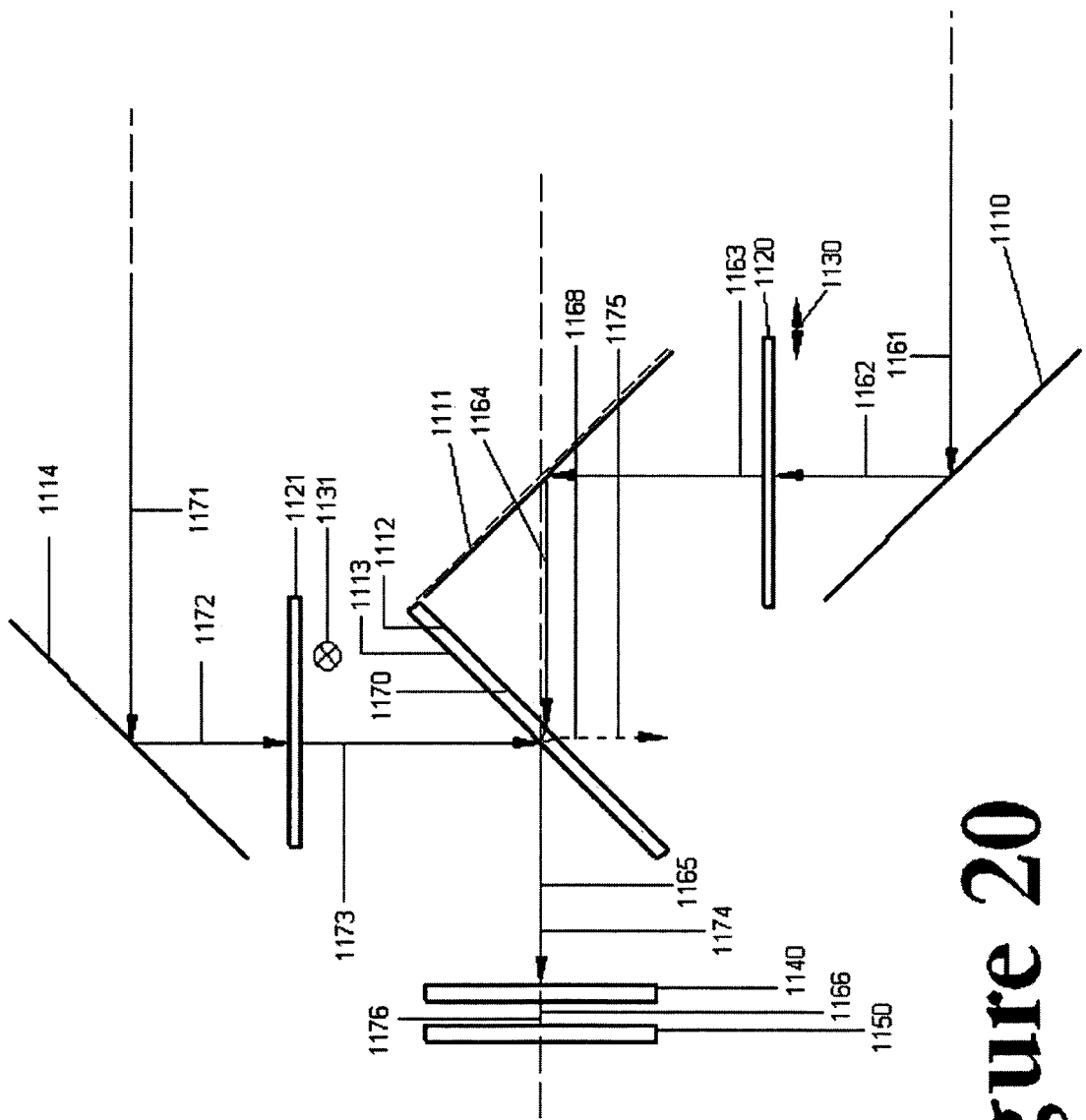
FIG. 20 illustrates one application of the DP filter of the present invention for recording stereoscopic image data.

FIG. 20 illustrates another embodiment of the DP filter of the present invention for recording stereoscopic image data. The embodiment of FIG. 20 includes a recording medium 1150, DP filter 1140, and an optical system. The optical system comprises two optical lens systems (not shown), two reflecting surfaces 1110 and 1114 for redirecting the light beam transmitted through the right and left lens systems, respectively. The optical system also includes two linear polarizing films 1120 and 1121 for polarizing the light beam from the right and left lens systems, respectively to polarize the light in a perpendicular direction. In addition, a third reflecting surface 1111 redirect light beams from either the left or right lens systems. A light beam splitter 1170 merges the two light beams from both light channels together.

In FIG. 20, reflective surfaces 1110 and 1114 are 100% reflection-coated to alter the left or right channel light beam by 90 degrees. The reflective surface 1111 is 100% reflection coated and is parallel to surface 1110. Beam splitter 1170 has two surfaces 1112 and 1113. Surface 1112 is 0% reflection-coated and surface 1113 is 50% reflection-coated. Beam splitter 1170 is placed parallel to surface 1114 and 90 degrees to surface 1111. Linear polarizing films 1120 and 1121 have their polarizing axis directions 1130 and 1131, respectively. The two directions of the polarizing axis are perpendicular to each other. Polarizing film 1120 is placed in the optical path of the right channel light before the light reaches reflective surface 1111, and polarizing film 1121 is placed in the optical path of the left channel light before the light reaches reflective surface 1113.

Under this arrangement, left channel light 1171 becomes polarizing light 1173 having a direction 1131. 50% of this incident light 1173 reflected from surface 1113 changes its polarizing direction 90 degrees such that 50% of the original left channel light 1171 going into DP filter 1140 has a polarizing direction 1130. Accordingly, right channel light 1161 becomes polarizing light 1163 having a direction 1130 after passing through polarizing film 1120. This polarized light is 100% reflected from surface 1111 and changes its polarizing direction 90 degrees. Light 1164 reaches surface 1112 and is 100% refracted into light beam splitter 1170 and 50% of that light passes through surface 1113, such that 50% of the original right channel light 1161 going into DP filter 1140 has a polarizing direction of 1131.

Recording medium 1150 comprises an image-recoding device used for taking the image incident light, such as CCD or CMOS sensor for digital camera, or film for a regular camera. DP filter 1140 is placed in front of the recording medium 1150 in the optical path before light 1165 and 1174 reaches the recording medium. The effective resolution of DP filter 1140 is the same as the effective resolution of recording medium 1150, and the distance between DP filter 1140 and recording medium 1150 is carefully calculated and arranged such that the light passing through every unit of DP filter 1140 reaches a corresponding pixel unit on recording medium 1150. Polarizing axis direction 119 in FIG. 13 of polarizing film 101 in FIG. 13 in DP filter 1140 may be in the same direction as either 1130 or 1131.

Light from right channel 1161 is redirected 90 degrees by reflecting surface 1110. Reflected light 1162 is polarized by polarizing film 1120. Polarized light 1163 is polarized in direction 1130 and is redirected 90 degrees again at surface 1111 towards recording medium 1150. Polarized light 1163 changes its polarizing direction by 90 degrees on reflecting surface 1110. Reflected light 1164 is polarized in direction 1131. Light 1164 100% refracted into light beam splitter 1170 and 50% of the light is passed through 1165, polarized in direction 1131, while the other 50% is reflected away 1168.

Light from left channel 1171 is redirected 90 degrees by reflecting surface 1114. Reflected light 1172 is polarized by polarizing film 1121. Polarized light 1173 is polarized in direction 1131. 50% of this light is passed through 1175 at surface 1113 while the other 50% are reflected 1174 towards recording medium 1150 and its polarizing direction changes 90 degrees. Reflected light 1174 is polarized in direction 1130.

The 50% light passed through surface 1113 from the right channel, which is polarized in direction 1131, is mixed with the 50% light reflected by surface 1113 from the left channel, which is polarized in direction 1130, after they leave the surface 1113. They both reach DP filter 1140 and DP filter 1140 selectively blocks the different directions of polarized light on different unit cells 109 in FIG. 13.

A pre-defined image-rendering rule may be used. For example, using odd rows for the left channel image, and the even rows for the right channel image. DP filter 1140 may be made or dynamically controlled to block the incident polarizing light with direction 1131 on the odd row units and block the incident polarizing light with direction 1130 on the even row units. In this manner, only the left channel light passes through DP filter 1140 at odd rows and reaches the odd row pixel cells on the recording medium 1150, and only the right channel light passes through DP filter 1140 at even rows and reaches the even row pixel cells on the recording medium.

FIG. 20 illustrates the principle of one embodiment of the present invention for creating stereoscope images or image data. For one of ordinary skill in the art, one or more lens groups may be insert into the structure described here for different purposes such as focusing, zooming, focal length changing, and other traditional lens design tasks.

FIG. 20 is intended to describe the underlying principles of the present invention, but not to limit the spirit or scope of the present invention. For example, polarizing film 1120, polarized in direction 1131, may be placed between surfaces 1111 and 1112. Polarizing film 1120 may also be placed in the optical path before the right channel light reaches surface 1110. Similarly, polarizing film 1121 may be placed in the optical path before the left channel light reaches surface 1114. Surface 1111 may be placed to compensate for the optical path offset caused by the refraction ratios not being equal to one on surfaces 1112 and 1113, and other incidental optical effects.

DP filter 1140 may also be made and controlled to block the left and the right channel light on every unit cell 109 in FIG. 2 at different time periods, such that recording medium 1150 may accept and record the left channel image at one time period and accept and record the right channel image at a next time period. When these two time periods are close enough, the stereoscope image pair may be recorded on different frames, one frame for the left image and the next frame for the right image.

Figure 21:
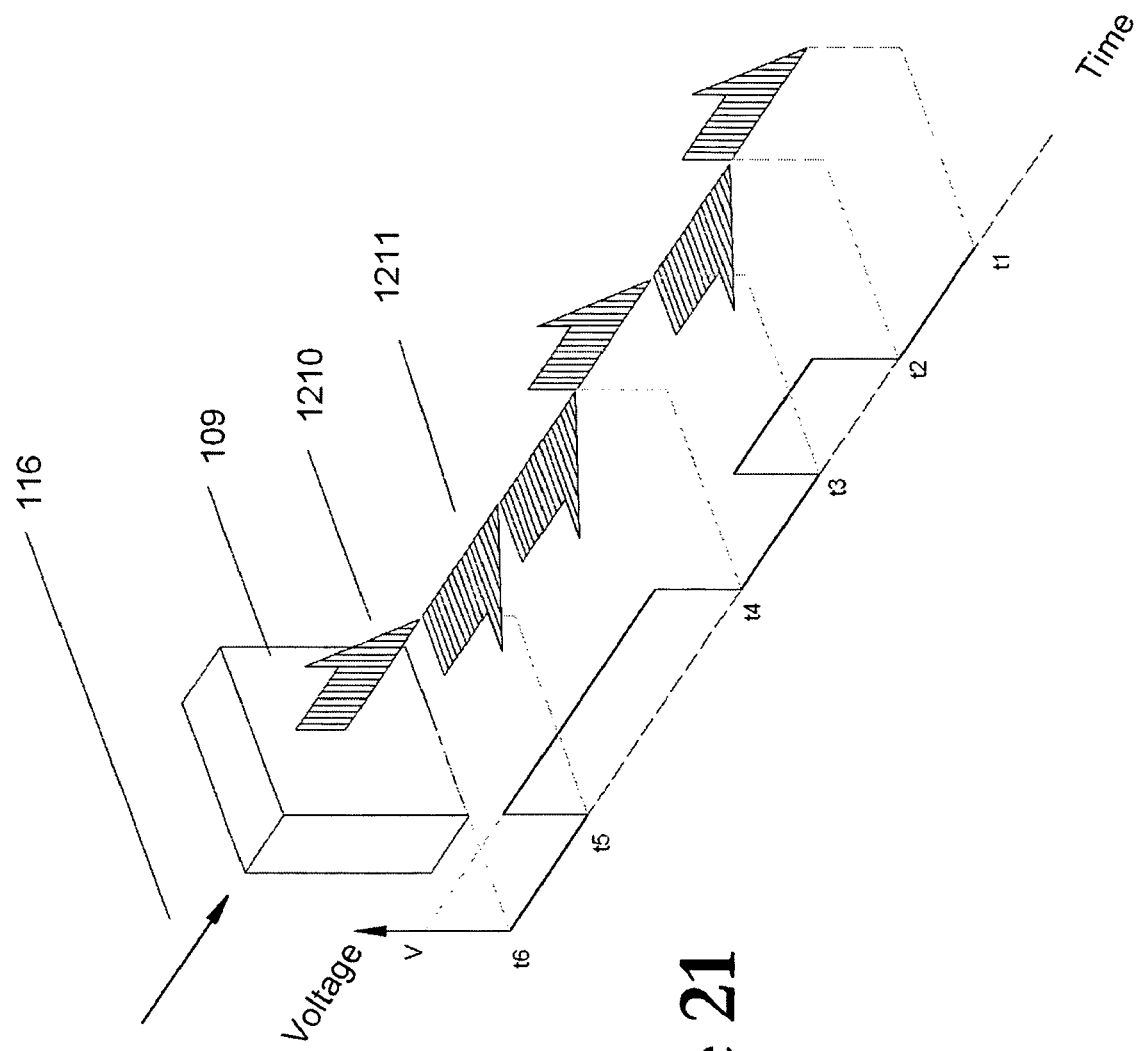
FIG. 21 illustrates one unit 109 of FIG. 12 on DP filter 100 of FIG. 2 controlling the polarizing direction over time.

FIG. 21 illustrates one unit 109 of FIG. 12 on DP filter 100 of FIG. 2 controlling polarizing direction over time. FIG. 21 illustrates the polarizing direction changes when the voltage applied on transparent electrode 110 of FIG. 12 changes over the time. In FIG. 21, incident light 116 comes to polarized film 101 of FIG. 12, polarized in the polarizing axis direction 1211. A voltage is applied to transparent electrode 110 of FIG. 12 at time period t2-t3 and t4-t5. No voltage is applied on the electrode at time period t1-t2, t3-t4 and t5-t6. The present time period for the example of FIG. 21 is t6, when a picture is taken. The polarizing direction of the illuminated light is 1211 at the time period t2-t3 and t4-t5. The polarizing direction of the illuminated light is 1210, which is perpendicular to direction 1211, at time period t1-t2, t3-t4 and t5-t6.

Figure 22:
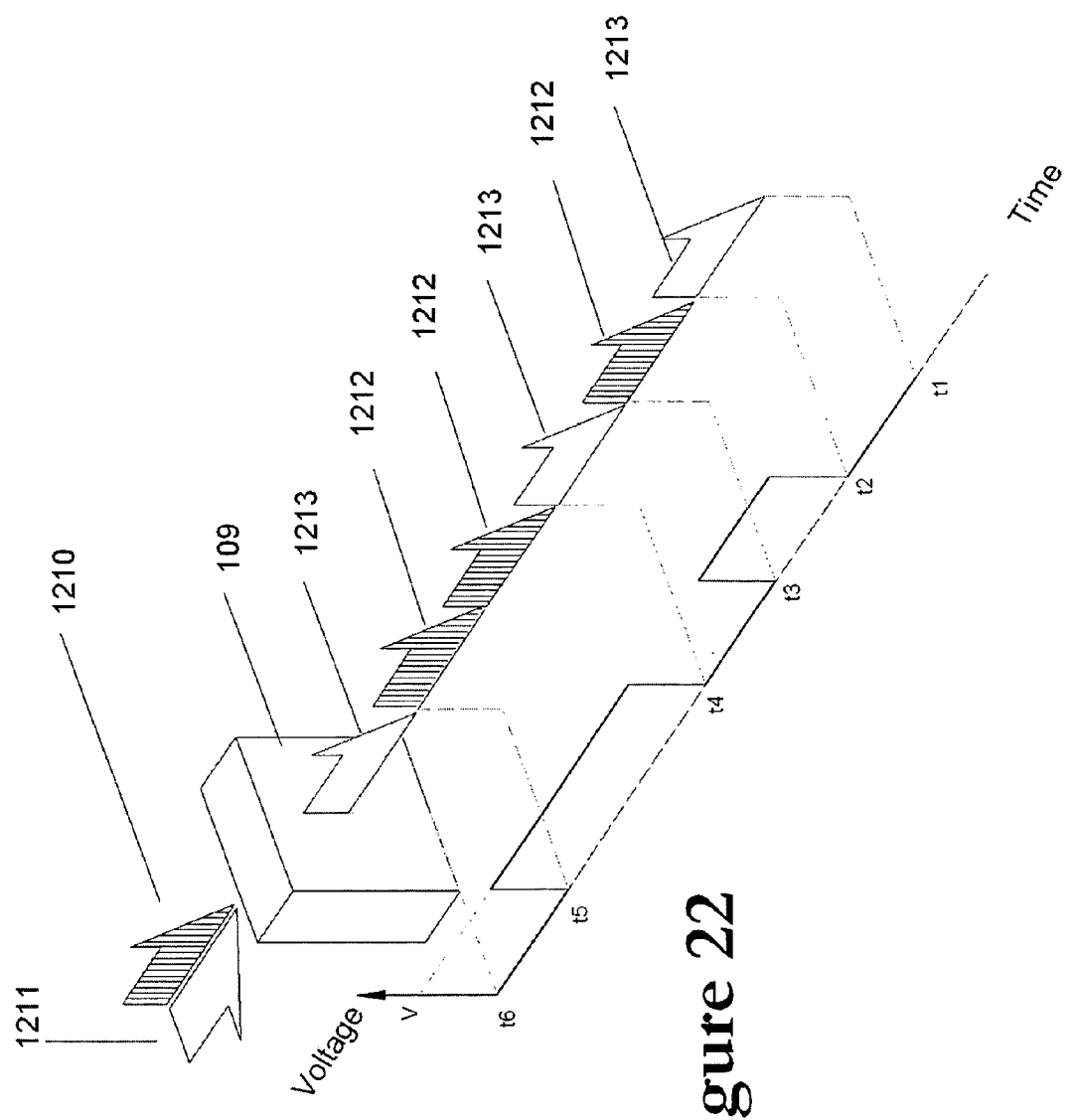
FIG. 22 illustrates one unit 109 in FIG. 13 on the DP filter 100 in FIG. 2, which selectively blocks incident polarizing light of different polarizing directions over time.

FIG. 22 illustrates how one unit 109 of FIG. 13 on DP filter 100 of FIG. 2 selectively blocks incident polarizing light of different polarizing direction over time. FIG. 22 illustrates the polarizing direction of the light blocked when the voltage applied on the transparent electrode 110 of FIG. 13 of this unit changes over the time. In FIG. 22, the incident light coming from second substrate 107 of FIG. 13 mixes two polarizing lights having perpendicular directions 1210 and 1211. Polarizing film of DP filter 101 of FIG. 13 has a polarizing axis direction 1210. Voltage is applied to transparent electrode 110 of FIG. 13 at time period t2-t3 and t4-t5. No voltage is applied to transparent electrode 110 at time period t1-t2, t3-t4 and t5-t6. The present time in this example is t6 when the picture is taken. Light 1212 passing through DP filter 101 at time period t2-t3 and t4-t5 is incident light 1210. Light 1213 passing through DP filter 101 at time period t1-t2, t3-t4, and t5-t6 is incident light 1211 but its polarizing direction is twisted 90 degrees from light 1211.

There are multiple ways to combine the different structures of the DP filter with different circuit driving methods and with different image mixing and rendering patterns. It may be apparent to those skilled in the art that various modification and variation may be made in the method of manufacturing a DP filter and various embodiment of the presented invention, or integrate with the various display device design without departing from the spirit or scope of the invention. Thus it is intended that the presented invention covers the modifications and variations of this invention provided they come within the scope of the Dual-Polarizing Filter and their equivalents.

While the preferred embodiment and various alternative embodiments of the invention have been disclosed and described in detail herein, it may be apparent to those skilled in the art that various changes in form and detail may be made therein without departing from the spirit and scope thereof.

We claim:

1. An apparatus for producing three-dimensional images including a Dual Polarizing Filter comprising:
   a first substrate and second substrate, facing and spaced apart from each other,
   a dual polarizing component for selectively changing the polarizing status of polarized light passing through portions of the first and second substrates, and
   a polarizing film attached on outside surface of first substrate,
   wherein the polarizing film attached on outside surface of first substrate polarizes light transmitted into first substrate,
   wherein the dual polarizing component selectively changes the polarization status of polarized light passing through the apparatus to produce first and second image portions having first and second polarization directions, the first and second image portions comprising a three-dimensional image, and
   wherein the dual polarizing component includes a common electrode layer formed on a surface of the first substrate, facing the second substrate, a unit control layer formed on a surface of the second substrate, facing the first substrate, and a liquid crystal sandwich structure layer formed between the unit polarizing control layer and the common electrode layer.

2. The apparatus of claim 1, wherein the liquid crystal sandwich layer further comprises:
   a first alignment layer and a second alignment layer with liquid crystal filled in between of them, wherein the first alignment layer and the second alignment layer have grooves formed on at least one surface, respectively, the grooves on the first alignment layer and the second alignment layer having directions substantially perpendicular to one another.

3. The apparatus of claim 2, wherein unit polarizing control layer comprises:
   transparent electrodes and electrical conductors including switching transistor units, controlling voltage applied on the transparent electrodes,
   wherein each transparent electrode is formed in a space divided by the electrical conductors and joins the electrical conductors by the switching transistor units.

4. The apparatus of claim 3, wherein the second substrate comprises a plurality of selectively polarizable polarization-status-changeable units, and each transparent electrode defines an individually controllable polarizable polarization-status-changeable unit.

5. The apparatus of claim 4, wherein the unit polarizing control layer further provides voltage control on each individual electrode and thus drives the liquid crystal with the common electrode layer to maintain or twist a polarizing direction of polarizing light passing through the liquid crystal layer, thus selectively controlling the polarizing direction of light from emanating from the apparatus.

6. The apparatus of claim 5, wherein the unit polarizing control layer comprises:
   transparent electrodes coupled to corresponding portions of the unit polarizing layer, and
   a driving circuit, coupled to the transparent electrodes, for selectively activating portions of the unit polarizing layer to selectively change polarization status at least portions of the unit polarizing control layer.

7. The apparatus of claim 6, wherein the driving circuit further comprises:
   voltage signal conductors for conducting a voltage to the unit polarizing control layer,
   switching signal conductors, for conducting a switched signal voltage to selected portions of the unit polarizing control layer, and
   switching transistors, connecting the transparent electrodes to the voltage signal conductors and the switching signal conductors, to selectively control voltage applied to selected portions of the unit polarizing control layer.

8. The apparatus of claim 7, wherein the unit polarizing control layer comprises a plurality of individual units, the individual units comprising first image units and second image units,
   wherein first image units have no voltage applied on corresponding transparent electrodes such that the polarization direction of light passing through first image units maintains unchanged, and
   wherein second image units have a voltage applied on corresponding transparent electrodes such that the polarization status of light passing through second image units is changed substantially perpendicularly.

9. The apparatus of claim 7, wherein the unit polarizing control layer comprises a plurality of individual units, the individual units comprising first image units and second image units,
   wherein first image units have a voltage applied on corresponding transparent electrodes such that the polarization direction of light passing through first image units maintains unchanged, and
   wherein second image units have no voltage applied on corresponding transparent electrodes such that the polarization status of light passing through second image units is changed substantially perpendicularly.

10. An apparatus for producing three-dimensional images including a Dual Polarizing Filter comprising:
    a first substrate and second substrate, facing and spaced apart from each other,
    a dual polarizing component for selectively changing the polarizing status of polarized light passing through portions of the first and second substrates, and
    wherein the dual polarizing component selectively changes the polarize status of polarized light passing through the apparatus to produce first and second image portions having first and second polarization directions, the first and second image portions comprising a three-dimensional image, and
    wherein the dual polarizing component includes a common electrode layer formed on a surface of the first substrate, facing the second substrate, a unit control layer formed on a surface of the second substrate, facing the first substrate, and a liquid crystal sandwich structure layer formed between the unit polarizing control layer and the common electrode layer,
    wherein the Dual-Polarizing Filter is integrated into an LCD display to produce a combined two-dimensional and three-dimensional display.

11. The apparatus of claim 1, where in the Dual-Polarizing Filter, is integrated into a non-LCD display that emits non-polarized light to produce a combined two-dimensional and three-dimensional display.

12. The apparatus of device of claim 1, wherein the Dual-Polarizing Filter is integrated into an image recording device for receiving a light source comprising differently polarized portions, such that the Dual-Polarizing Filter selectively passes the differently polarized portions to different areas of the image recording device.

13. The apparatus device of claim 3, wherein at least one of the transparent electrodes may be selectively activated to redirect polarization of a selected portion of polarized light passing through the Dual-Polarizing Display Component.

14. The apparatus of claim 13, wherein the at least one transparent electrodes comprises a plurality of electrodes each corresponding to one or more of a plurality of pixels, such that each unit of the Dual-Polarizing Filter can selectively alter polarization of light for a corresponding pixel.

15. An apparatus for recording three-dimensional images, comprising:
    two lenses, spaced apart a predetermined distance to simulate distance between human eyes, the two lenses collect left image light and the right image light,
    means for polarizing the left image light and right image light, such that the direction of the respective right image light and left image light is substantially perpendicular to one another, and
    means for merging the left image light and the right image light together and redirected the merged image towards an image-recording device,
    wherein the means for polarizing comprises a dual polarizing filter controlled such that it either blocks the left lens light or blocks the right lens light at different portions of the image recording device, such that substantially half the units block left lens light and substantially half the units block right lens light so that left images and right images are recorded at different pixel location in the recording device.

16. The apparatus of claim 15, wherein the image recording device comprises at least one of an electronic and analog image recording devices.

17. The apparatus of claim 16, wherein the dual polarizing filter comprises:
    first and second substrates spaced apart from each other having inner surfaces facing each other;
    a common electrode on an inner surface of the first substrate;
    a driving circuit on an inner surface of the second substrate;
    a unit electrode connected to the driving circuit;
    a polarizing film on an outer surface of the first substrate, having a predetermined polarizing axis; and
    a liquid crystal layer, comprising liquid crystal sandwiched between a first alignment and second alignment plates, each having fine grooves formed on facing surfaces thereof and interposed between the common electrode and the unit electrode,
    wherein the fine grooves of the first and second alignment plates are substantially perpendicular to each other.

18. A method of generating a three-dimensional image, comprising the steps of:
    capturing a three-dimensional image using two two-dimensional images representing two-dimensional views from a view's left eye and a viewer's right eye, and storing the two two-dimensional images of left and right views, respectively, selectively displaying the left view and right view of the three dimensional image on a two dimensional display, and viewing the three-dimensional image using polarized glasses to view the two dimensional display, where polarizing directions of light from the left view and the right view are parallel with polarizing axes of a left lens and a right lens of the polarizing glasses, respectively, such that a viewer wearing the polarized glasses perceives a three-dimensional image, wherein pixels in the two-dimensional display are polarized as groups or individually, to display pixels from the left view and the right view simultaneously, such that at least some of the pixels from the left view are polarized in one direction and pixels from the right view are polarized in another direction, wherein a viewer wearing the polarized glasses sees the left view substantially with the left eye and the right view substantially with the right eye, wherein the two-dimensional display comprises a plurality of image generating pixels and a plurality of polarizing direction changing units, each polarizing direction changing unit aligned with a corresponding pixel in the two-dimensional display in a one-to-one relationship, and wherein light illuminated through each pixel travels through a corresponding polarization direction changing unit and becomes polarized light of different polarize direction.

19. The method of claim 18, wherein pixels in the two-dimensional display are alternately polarized to display pixels from the left view and the right view in successive displays, such that at least some of the pixels from the left view are polarized in one direction and pixels from the right view are polarized in another direction, wherein a viewer wearing the polarized glasses sees the left view substantially with the left eye and the right view substantially with the right eye.

20. The method of claim 19, wherein each polarizing unit controls polarization direction of light from each corresponding pixel such that pixels displaying the left view are polarized in a first direction and pixels displaying the right view are polarized in a second direction unequal to the first direction.

21. The method of claim 20, wherein the first direction and the second direction are substantially perpendicular.

22. The method of claim 18 wherein the left view and the right view are interlaced on the two-dimensional display such that pixels for the left view are displayed on one or more rows alternated by pixels from the right view on one or more rows.

23. The method of claim 18 wherein the left view and the right view are interlaced on the two-dimensional display such that pixels for the left view are displayed on one or more columns alternated by pixels from the right view.

* * * * *